(12) United States Patent
Wang et al.

(10) Patent No.: US 11,206,107 B2
(45) Date of Patent: Dec. 21, 2021

(54) COMMUNICATION APPARATUS AND COMMUNICATION METHOD FOR SIDELINK COMMUNICATION USING A FEEDBACK TIMING

(71) Applicant: Panasonic Intellectual Property Corporation of America, Torrance, CA (US)

(72) Inventors: Lilei Wang, Beijing (CN); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 132 days.

(21) Appl. No.: 16/621,839

(22) PCT Filed: Jul. 28, 2017

(86) PCT No.: PCT/CN2017/095001
§ 371 (c)(1),
(2) Date: Dec. 12, 2019

(87) PCT Pub. No.: WO2019/019184
PCT Pub. Date: Jan. 31, 2019

(65) Prior Publication Data
US 2020/0412485 A1 Dec. 31, 2020

(51) Int. Cl.
*H04L 1/16* (2006.01)
*H04L 1/00* (2006.01)
(Continued)

(52) U.S. Cl.
CPC .......... *H04L 1/1614* (2013.01); *H04L 1/0073* (2013.01); *H04L 1/0081* (2013.01); *H04L 1/1854* (2013.01); *H04L 5/0055* (2013.01)

(58) Field of Classification Search
CPC ..... H04L 1/1864; H04L 1/1887; H04L 1/189; H04L 1/1896; H04L 1/1614;
(Continued)

(56) References Cited

U.S. PATENT DOCUMENTS

2014/0010175 A1 1/2014 Chiu
2016/0302252 A1 10/2016 Wang et al.
2017/0347394 A1* 11/2017 Yasukawa ............. H04L 1/1896

FOREIGN PATENT DOCUMENTS

JP 2017-516323 A 6/2017
WO 2016/076301 5/2016

OTHER PUBLICATIONS

LTE in a Nutshell: The Physical Layer, 2010, Telesystem Innovations Inc., p. 11, https://home.zhaw.ch/kunr/NTM1/literatur/LTE%20in%20a%20Nutshell%20-%20Physical%20Layer.pdf (Year: 2010).*
(Continued)

*Primary Examiner* — Justin R Knapp
(74) *Attorney, Agent, or Firm* — Seed IP Law Group LLP

(57) ABSTRACT

There are provided a communication apparatus and a method. The communication apparatus comprising: a receiver, operative to receive, in a first time period, a plurality of transport blocks (TBs) transmitted by another communication apparatus; and circuitry, operative to generate a plurality of feedback bits respectively for the received TBs, and perform at least one of multiplexing and bundling on at least a part of the feedback bits according to the number of the feedback bits to generate feedback information.

14 Claims, 21 Drawing Sheets

(51) Int. Cl.
*H04L 1/18* (2006.01)
*H04L 5/00* (2006.01)

(58) Field of Classification Search
CPC ... H04L 1/0073; H04L 1/0081; H04L 1/1854; H04L 5/0055; H04W 28/04; H04W 72/04; H04W 92/18; H04W 72/1289
See application file for complete search history.

(56) References Cited

OTHER PUBLICATIONS

International Search Report of PCT application No. PCT/CN2017/095001 dated Apr. 19, 2018.

\* cited by examiner

COMMUNICATION APPARATUS AND COMMUNICATION METHOD FOR SIDELINK COMMUNICATION USING A FEEDBACK TIMING

CROSS-REFERENCE TO RELATED APPLICATIONS

This application is a U.S. national stage application of the PCT International Application No. PCT/CN2017/095001 filed on Jul. 28, 2017, the contents all of which are incorporated herein by reference.

BACKGROUND

1. Technical Field

The present technology relates to wireless communication field, and more particular, to a communication apparatus and a communication method for communicating feedback information.

2. Description of the Related Art

Further enhancement of device to device (FeD2D) is a work item targeting for optimizing communications between wearable devices/internet of things (IoT) devices and relay user equipments (UEs). In current sidelink related standards, no physical layer is specified for feedback during Hybrid Automatic Repeat Request (HARQ) procedure. Therefore, such HARQ feedback is one of topics discussed in FeD2D and is targeted to be improved.

SUMMARY

One non-limiting and exemplary embodiment facilitates avoiding unnecessary retransmission and improving communication performance effectively.

In one general aspect, it is to provide a communication apparatus operative for communication via sidelink, comprising: a receiver, operative to receive, in a first time period, a plurality of transport blocks (TBs) transmitted from another communication apparatus; and circuitry, operative to generate a plurality of feedback bits respectively for the received TBs, and perform at least one of multiplexing and bundling on at least a part of the feedback bits according to the number of the feedback bits to generate feedback information.

In another general aspect, it is to provide a communication method for communication via sidelink, comprising: receiving, in a first time period, a plurality of transport blocks (TBs) transmitted from another communication apparatus; generating a plurality of feedback bits respectively for the TBs received in the first time period; and performing at least one of multiplexing and bundling on at least a part of the feedback bits according to the number of the feedback bits to generate feedback information.

In another general aspect, it is to provide a communication apparatus operative to perform communication via sidelink comprising: a transmitter, operative to transmit a plurality of transmit blocks (TBs) to another communication apparatus; a receiver, operative to receive feedback information from the another communication apparatus; and circuitry, operative to control the transmitter to retransmit a part of the TBs in response to the feedback information, wherein the feedback information is generated by the another communication apparatus by performing at least one of multiplexing and bundling on at least a part of a plurality of feedback bits according to the number of the feedback bits, and wherein the feedback bits are respectively generated for the TBs received by the another communication apparatus in a first time period.

In another general aspect, it is to provide a communication method for communication via sidelink, comprising: transmitting a plurality of transmit blocks (TBs) to a communication apparatus by a transmitter; receiving feedback information from the communication apparatus; and controlling the transmitter to retransmit a part of the TBs in response to the feedback information, wherein the feedback information is generated by the communication apparatus by performing at least one of multiplexing and bundling on at least a part of a plurality of feedback bits according to the number of the feedback bits, and wherein the feedback bits are respectively generated for the TBs received by the communication apparatus in the first time period.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1A:
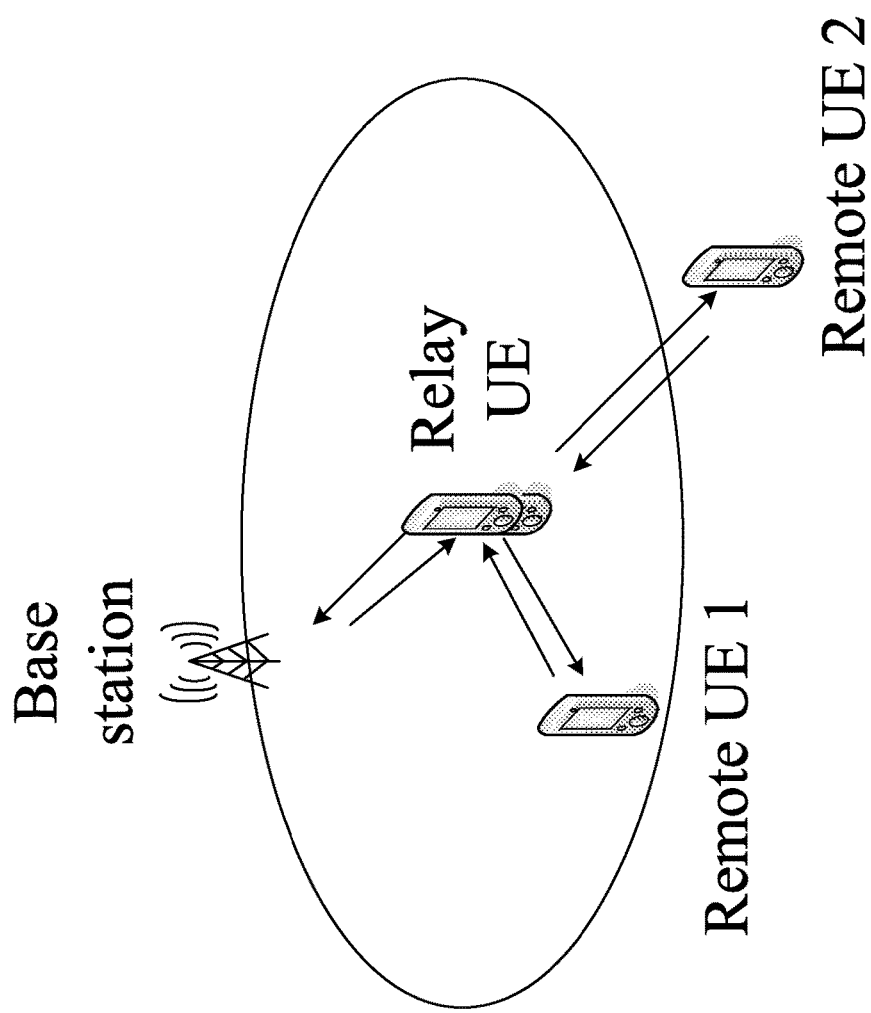
FIGS. 1A-1B schematically show examples of application scenarios applying a communication scheme according to an embodiment of the present disclosure.

Embodiments will now be described with reference to the drawings, which relate to a communication method, apparatus and system. It is understood that the present technology may be embodied in many different forms and in many different orders and should not be construed as being limited to the embodiments set forth herein. Rather, these embodiments are provided so that this disclosure will be thorough and complete and will fully convey the present technology to those skilled in the art. Indeed, the present technology is intended to cover alternatives, modifications and equivalents of these embodiments, which are included within the scope and spirit of the technology as defined by the appended claims. Furthermore, in the following detailed description of the present technology, numerous specific details are set forth in order to provide a thorough understanding of the present technology. However, it will be clear to those of ordinary skill in the art that the present technology may be practiced without such specific details.

While orders of the steps of the methods and the structures of the components are provided herein for exemplary purposes, but not for limitation. The following detailed description of the technology will be presented for purposes of illustration and description. It is not intended to be exhaustive or to limit the technology to the precise form disclosed. Many modifications and variations are possible in light of the above teaching. The described embodiments are chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

In a current communication system, such as long term evolution (LTE) communications system, at a receiver, respective feedback bits are determined corresponding to respective transport blocks (TBs) received from a transmitter, and the receiver performs either bundling or multiplexing on the feedback bits to generate feedback information in a HARQ procedure. Whether to perform bundling or multiplexing is configured by radio resource control (RRC) signaling received from the transmitter, which is referred to as semi-static feedback mode. However, in FeD2D, such semi-static feedback mode (either bundling or multiplexing) may not be appropriate or flexible as the number of received TBs during a time period may vary largely. When the number of received TBs in the time period is relatively large, if the receiver performs bundling to generate the feedback information, errors in only one TB in the number of received TBs may even cause all the TBs to be retransmitted. However, other TBs successfully received without errors need not to be retransmitted, thus, retransmitting of all the TBs causes unnecessary retransmission, wastes communication resources and degrades the communication performance. If the receiver performs multiplexing, when the number of the bits of the feedback information exceeds the payload size of a feedback channel, the communication performance is seriously affected.

Figure 1B:
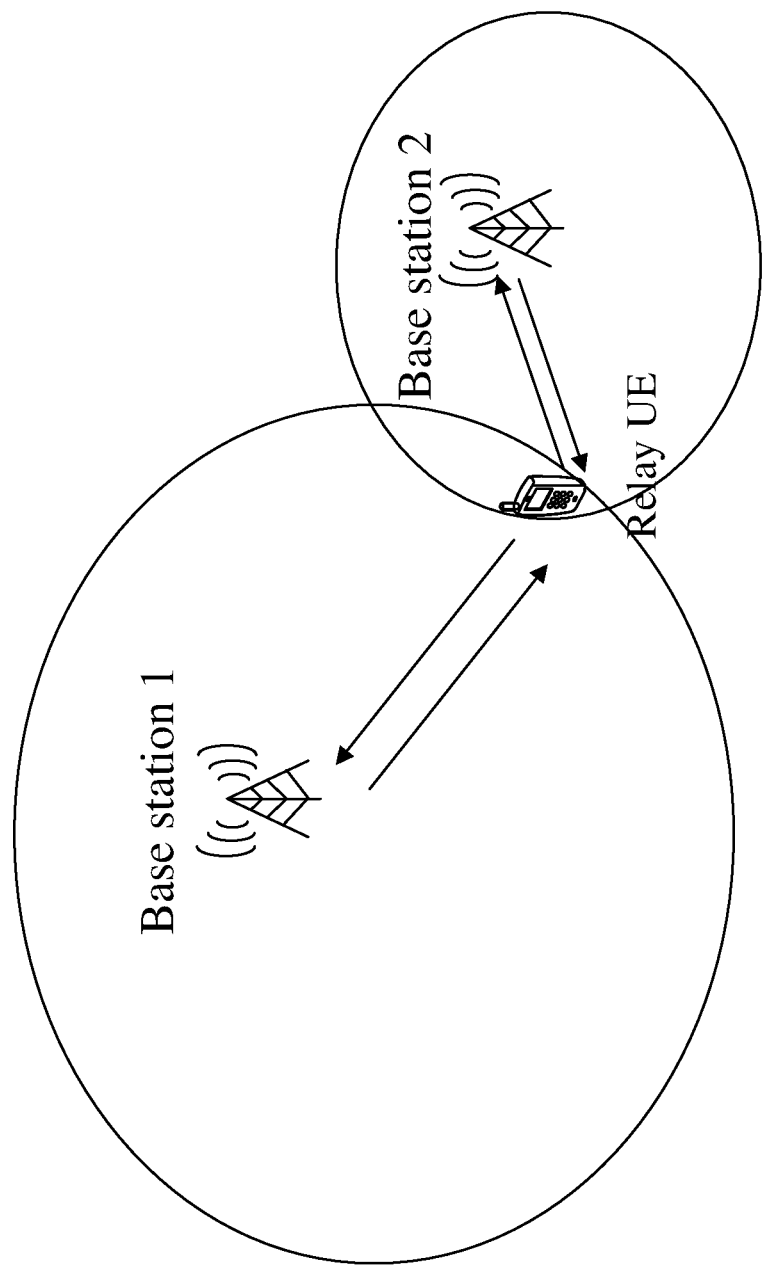

FIGS. 1A-1B schematically show examples of application scenarios applying a communication scheme according to an embodiment of the present disclosure.

As shown in FIG. 1A, the application scenario includes a base station, a relay UE, and multiple remote UEs (e.g., IoT devices), such as a remote UE 1 and a remote UE 2. The relay UE communicates with the base station in a bidirectional mode via uplink and downlink, and communicates with remote UEs in a bidirectional mode via sidelink by transmitting data (e.g., user data) and signaling to the remote UEs and/or receiving data (e.g., user data) and signaling from the remote UEs. A communication method according to embodiments of the present disclosure may be applied to the application scenario shown in FIG. 1A for communicating feedback information via sidelink.

As shown in FIG. 1B, the application scenario includes multiple base stations, such as a base station 1 and a base station 2, and a relay UE. The relay UE communicates with the multiple base stations in a bidirectional mode via uplink and downlink. And data can be communicated in allocated resource blocks, between the relay UE and the base stations. The resource block is a group of resource elements spanning consecutive subcarriers in the frequency domain and a slot in the time domain.

To be noted that the base station may be called as Evolved Node B (eNB), gNB, and other types of base stations in different communication standards.

Figure 2A:
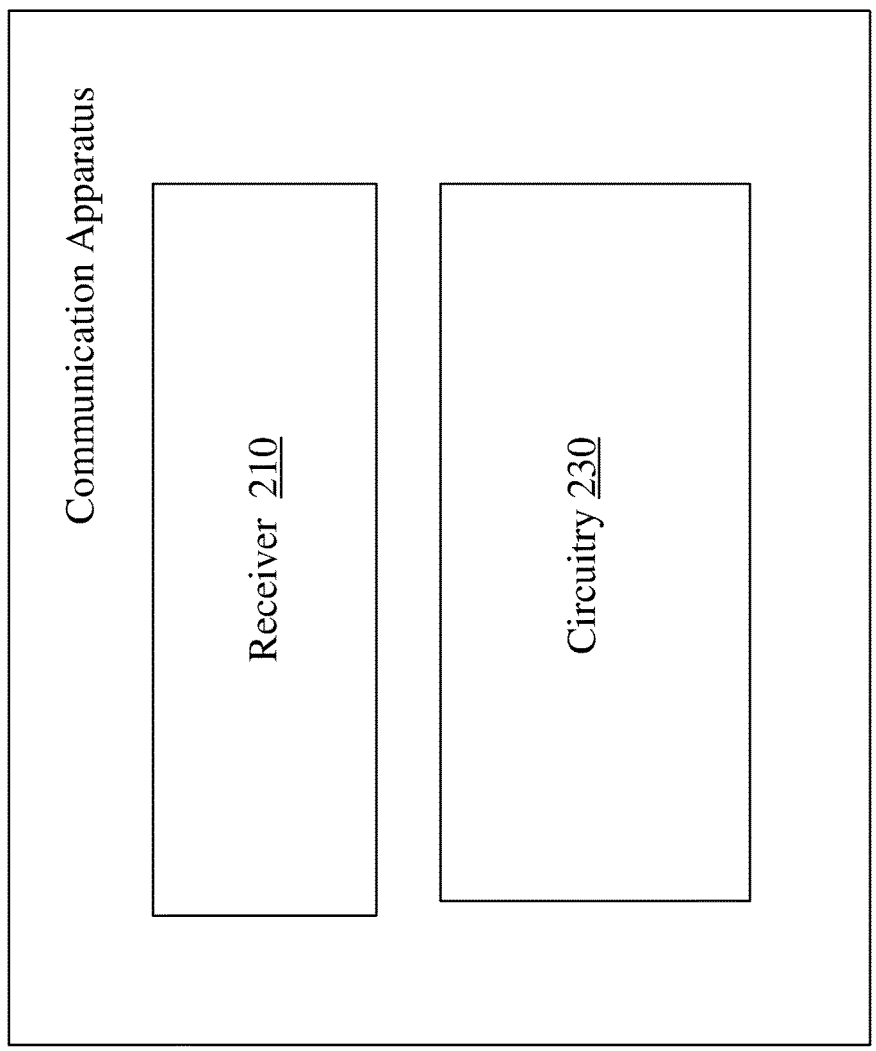
FIG. 2A schematically shows a block diagram of an example of a communication apparatus according to an embodiment of the present disclosure.

FIG. 2A schematically shows a block diagram of an example of a communication apparatus 200 according to an embodiment of the present disclosure.

In one embodiment, the communication apparatus 200 may be a remote UE as shown in FIG. 1A, for receiving signaling and data (e.g., user data) from another communication apparatus, such as a relay UE (shown in FIG. 1A) via sidelink. In another embodiment, the communication apparatus 200 may be the relay UE shown in FIG. 1B for receiving signaling and data (e.g., user data) from a base station via downlink. In another embodiment, the communication apparatus may be a relay UE for receiving from signaling and data (e.g., user data) from another communication apparatus, such as a remote UE via sidelink.

As shown in FIG. 2A, the communication apparatus 200 includes a receiver 210 and circuitry 230. In an embodiment, the receiver 210 is operative to receive, in a first time period, multiple transport blocks (TBs) transmitted from another communication apparatus, and the circuitry 230 is operative to generate multiple feedback bits respectively for the received TBs, and perform at least one of multiplexing and bundling on at least a part of the feedback bits according to the number of the feedback bits to generate feedback information.

In one embodiment, the receiver 210 may receive TBs in different time periods. An example of the time period may be a scheduling assignment (SA) period for communication between a relay UE and a remote UE in D2D scenario (such as the scenario shown in FIG. 1A). That is, in D2D, the time period may be a SA period.

Figure 3:
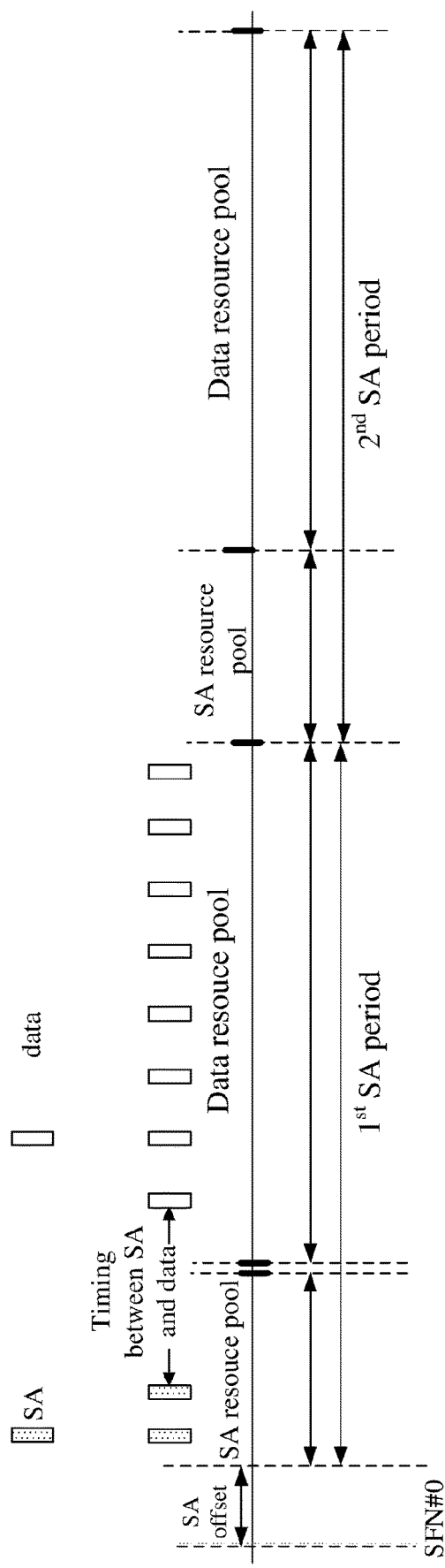
FIG. 3 schematically shows an example of a scheduling assignment (SA) period according to an embodiment of the present disclosure.

FIG. 3 schematically shows an example of a scheduling assignment (SA) period according to an embodiment of the present disclosure.

The communication apparatus 200 may receive the SA and/or TBs transmitted from another communication apparatus, e.g., an external transmitter.

As shown in FIG. 3, in each SA period, from a perspective of the external transmitter (e.g., a relay UE shown in FIG. 1A) that performs communication with the communication apparatus 200 (e.g., a remote UE shown in FIG. 1A), the external transmitter transmits a scheduling assignment (SA, shown in the figure as blocks filled with dots) within a SA resource pool and transmits multiple transport blocks (TBs, shown in the figure as unfilled blocks) within a data resource pool in a first SA period. The external transmitter transmits the SA in a format of sidelink control information (SCI). The SA resource pool is time and frequency resource to transmit the SA (or physical sidelink control channel, PSCCH) by the external transmitter. The data resource pool is time and frequency resource to transmit TBs (or PSSCH) by the external transmitter. The external transmitter transmits another SA within another SA resource pool and transmitting multiple further transport blocks (TBs, shown in the figure as unfilled blocks) within another data resource pool in a second SA resource period after the first SA period.

From a perspective of the communication apparatus 200 (e.g., a remote UE shown in FIG. 1A), the receiver 210 receives SA (shown in the figure as blocks filled with dots) shown in FIG. 3 transmitted from the external transmitter within a SA resource pool, and receives multiple transport blocks (TBs, shown as unfilled blocks in FIG. 3) transmitted from the external transmitter within a data resource pool in a first SA period. The receiver 210 receives the SA in a format of sidelink control information (SCI). In a second SA resource period after the first SA period, the receiver 210 receives the SA transmitted from the external transmitter within another SA resource pool and receives multiple transport blocks (TBs, shown as unfilled blocks in the figure) transmitted from the external transmitter within another data resource pool.

Although two SA periods are shown in FIG. 3, the SA periods shown in FIG. 3 are only for illustrative purpose and other number of the SA periods is available herein.

Referring back to FIG. 2A, the circuitry 230 is operative to generate multiple feedback bits respectively for the TBs received in the first time period, and perform at least one of multiplexing and bundling on at least a part of the feedback bits according to the number of the feedback bits to generate feedback information. In one embodiment, for each received TB, the circuitry 230 may generate a feedback bit indicating whether the TB has been successfully received. For example, feedback bit "1" indicates that the TB has been successfully received, while the feedback bit "0" indicates that the received TB is failed, e.g., has some errors, or has not been successfully received.

The circuitry 230 generates the feedback information indicating the status of the received TBs by performing processing on the feedback bits respectively for the received TBs. In an embodiment, the circuitry 230 may perform at least one of multiplexing and bundling on at least a part of the feedback bits according to the number of the feedback bits to generate the feedback information.

Figure 2B:
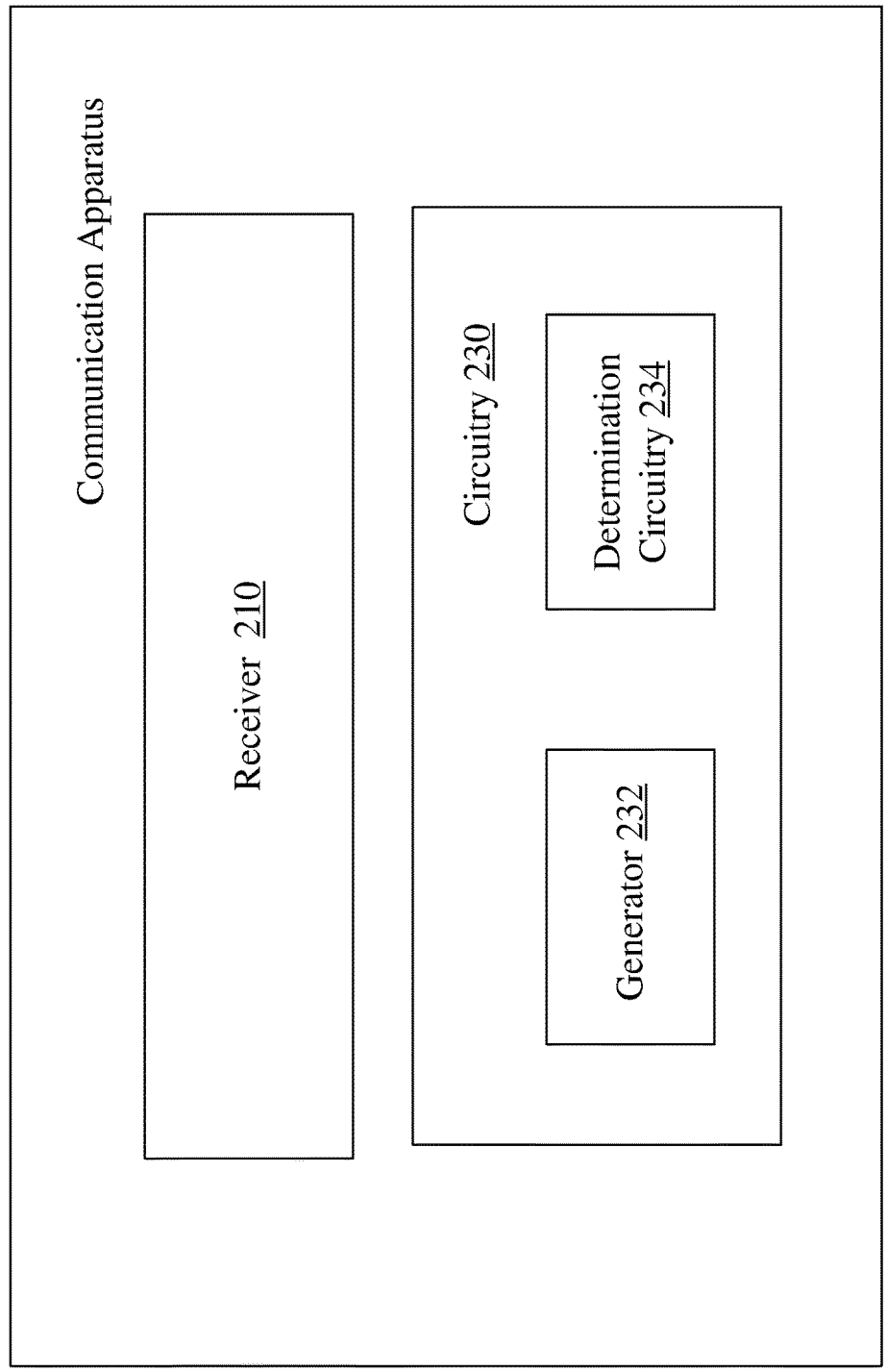
FIG. 2B schematically shows a block diagram of an example of a communication apparatus according to an embodiment of the present disclosure.

In one embodiment, the circuitry 230 may include a generator 232 and a determination circuitry 234, as shown in the example of FIG. 2B. Elements having similar functions shown in FIG. 2B as FIG. 2A are labeled the same and will not be repetitively described herein for purpose of brevity and clarity.

In one embodiment, the determination circuitry 234 is operative to determine a timing for transmitting the feedback information. The detailed operation of the determination circuitry 234 will be described in detail with reference to FIGS. 6-9.

The generator 232 may generate the feedback information indicating the status of the received TBs by performing processing on the feedback bits. In an embodiment, the generator 232 may perform at least one of multiplexing and bundling on at least a part of the feedback bits according to the number of the feedback bits to generate the feedback information.

The operation of the generator 232 generating the feedback information will be described with reference to FIGS. 4A-4C, which schematically show operations of generating the feedback information according to embodiments of the present disclosure.

In an embodiment, when the number of the feedback bits generated for the TBs received in the first time period is greater than a payload size of a feedback channel, the generator 232 bundles a first part of the feedback bits to generate a bundled feedback bit, multiplexes a second part of feedback bits to generate multiplexed feedback bits, and combines the bundled feedback bit and the multiplexed feedback bits to generate the feedback information. In one embodiment, the feedback information is transmitted in the feedback channel, and the number of bits transmitted in the feedback channel is not greater than the payload size of the feedback channel.

Figure 4A:
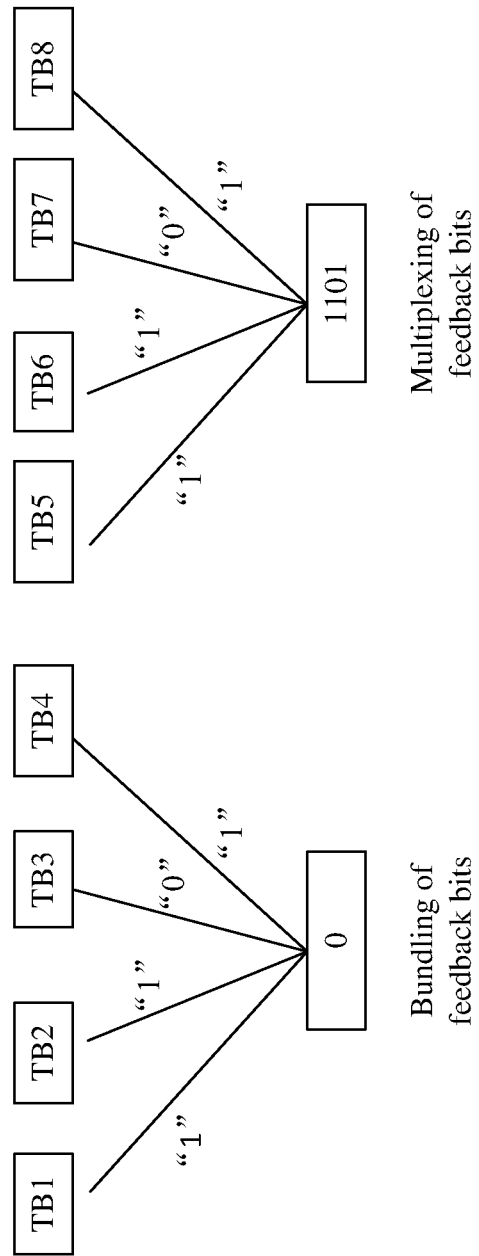
FIGS. 4A-4C schematically show operations of generating the feedback information according to embodiments of the present disclosure.

Referring to FIG. 4A, taking 8 feedback bits generated for 8 TBs (TB1-TB8) received by the receiver 210 in a time period (SA period) for an example. In one embodiment, feedback "1" indicates the TB has been successfully received, while the feedback bit "0" indicates the received TB is failed. In this situation, the TB3 and TB7 have not been successfully received as shown in the example of FIG. 4A. If the payload size of a feedback channel is less than the number of the feedback bits, assuming the payload size of 5, the generator 232 may bundle a first part of the feedback bits ("1101") using "AND" operation to generate a bundled feedback bit ("0"), multiplexes a second part of feedback bits ("1101") to generate multiplexed feedback bits ("1101"), and combines the bundled feedback bit and the multiplexed feedback bits to generate the feedback information ("01101"). Therefore, the number of bits transmitted in the feedback channel is not greater than the payload size of the feedback channel, and only TB1-TB4 and TB7, instead of all the TBs, need to be retransmitted.

Alternatively, the generator 232 may also bundle the second part of the feedback bits ("1101") using "AND" operation to generate a bundled feedback bit ("0"), and multiplex the first part of feedback bits ("1101") to generate the multiplexed feedback bits ("1101"), and combine the bundled feedback bit and the multiplexed feedback bits to generate the feedback information ("11010").

The embodiment shown in FIG. 4A is only for the purpose of illustration, and other variations are available depending on the requirements of the communication. For example, the number of the feedback bits and the number of bits included in each part may vary depending on the requirements of the communication. Moreover, the sequence of performing multiplexing and bundling may also vary depending on the requirements of the communication. The number of feedback bits is not limited to 8 as shown in FIG. 4A, but may vary depending on the requirements of the communication.

Advantageously, in the situation that the received TBs in a time period is relatively large, by multiplexing a part of the feedback bits and bundling a part of the feedback bits to generate the feedback information, the number of bits of the feedback information transmitted in the feedback channel does not exceed the payload size of the feedback channel, the unnecessary of retransmission can be avoided, and the communication performance can be effectively improved.

In an embodiment, when the number of the feedback bits is greater than a payload size of a feedback channel, the generator 232 may bundle all of the feedback bits in a unit of at least two feedback bits to generate the feedback information. The number of feedback bits may be the same or may be varied among the units.

Figure 4B:
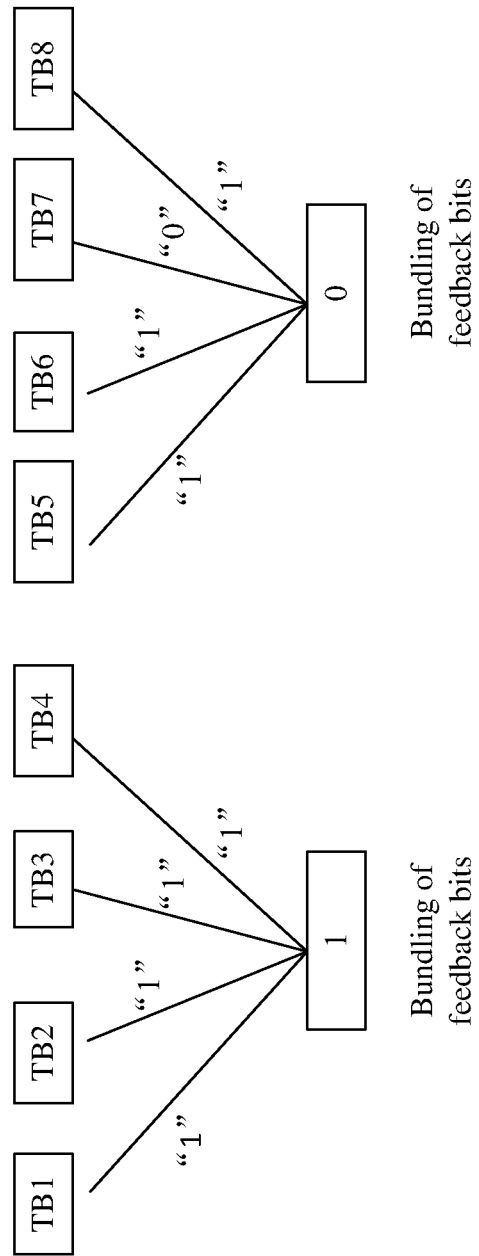

As shown in FIG. 4B, 8 feedback bits are generated for 8 TBs (TB1-TB8) received by the receiver 210 in a time period (SA period). The TB7 has not been successfully received as shown in the example of FIG. 4B. If the payload size of a feedback channel is less than the number of the feedback bits, assuming the payload size of 5, the generator 232 bundles all the feedback bits using "AND" operation in a unit of at least two feedback bits to generate the feedback information. As shown in FIG. 4B, the generator 232 bundles 4 feedback bits ("1111") to generate a bundled bit "1", and bundles another 4 feedback bits ("1101") to generate a bundled bit "0". The generator 232 combines the bundled bits to generate the feedback information ("10") to indicate the receiving status of the TBs. The number of bits transmitted in the feedback channel is not greater than the payload size of the feedback channel. According to the feedback information, only TB4-TB7 needs to be retransmitted.

The embodiment shown in FIG. 4B is only for the purpose of illustration; the feedback bits for bundling in each unit do not need to be equal with each other, and may vary depending on requirements of the communication. The number of feedback bits is not limited to 8 as shown in FIG. 4B, but may vary depending on the requirements of the communication.

Advantageously, in the situation that the received TBs in a time period is relatively large, by bundling all the feedback bits in a unit of at least two feedback bits to generate the feedback information, the number of bits of the feedback information transmitted in the feedback channel does not exceed the payload size of the feedback channel, the unnecessary of retransmission can be avoided, and the communication performance can be effectively improved.

In an embodiment, when the number of the feedback bits is not greater than a payload size of a feedback channel, the generator 232 multiplexes the plurality of feedback bits to generate the feedback information.

Figure 4C:
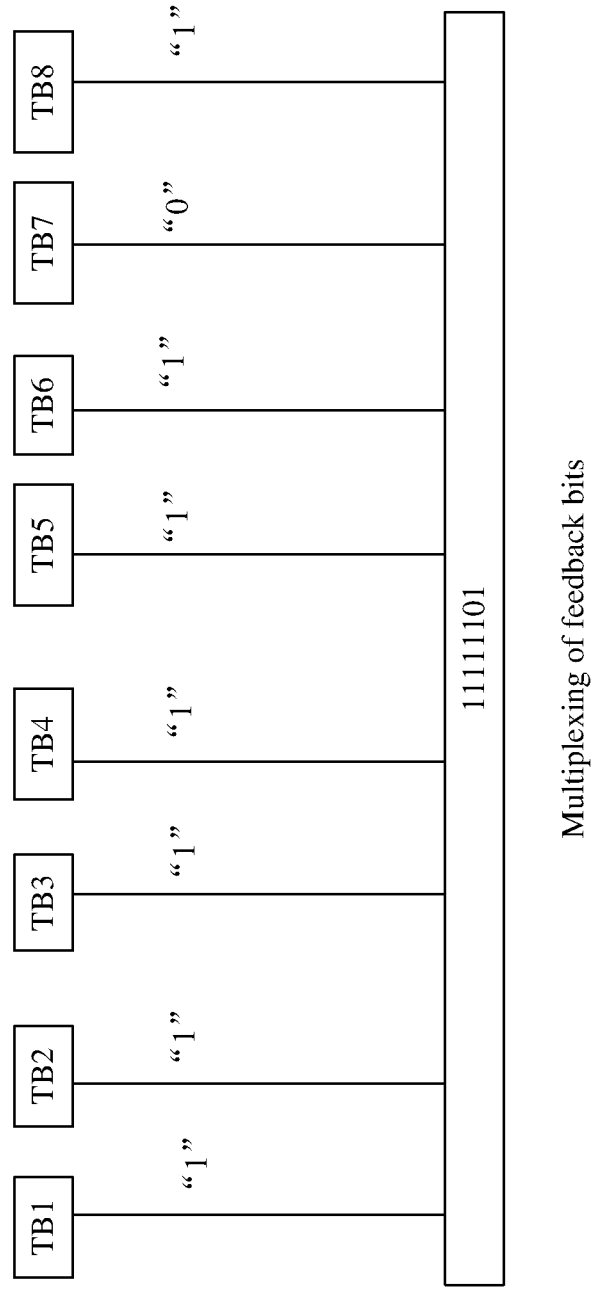

Referring to FIG. 4C, 8 feedback bits are generated for 8 TBs (TB1-TB8) received by the receiver 210 in a time period (SA period). The TB7 has not been successfully received as shown in the example of FIG. 4C. If the payload size of a feedback channel is greater than the number of the feedback bits, assuming the payload size of 10, the generator 232 multiplexes all the feedback bits to generate the feedback information. As shown in FIG. 4C, the generator 232 multiplexes all the feedback bits ("11111101") to generate the feedback information ("11111101"). The number of bits transmitted in the feedback channel is not greater than the payload size of the feedback channel. In addition, according to the feedback information, only TB7 needs to be retransmitted, therefore, the communication delay is greatly decreased and the power of the communication apparatus is saved effectively.

Advantageously, by performing at least one of multiplexing and bundling on the feedback bits according to the number of the feedback bits to generate feedback information, unnecessary retransmission can be avoided, the communication delay can be decreased, and the communication performance and the flexibility of the feedback can be greatly improved.

The embodiment shown in FIG. 4C is only for the purpose of illustration, and other variations are available depending on the requirement of the communication. For example, the number of the feedback bits is not limited to 8 as shown in FIG. 4C, but may vary depending on the requirements of the communication.

The operation of generating the feedback information is not limited to the scenario shown in FIG. 1A, but also applies to the scenario shown in FIG. 1B. That is, the relay UE shown in FIG. 1B may generate the feedback information according to the scheme as described above with reference to FIGS. 4A-4C, and transmit the generated feedback information to the base station accordingly. The above mentioned advantages can be achieved as well.

Figure 5A:
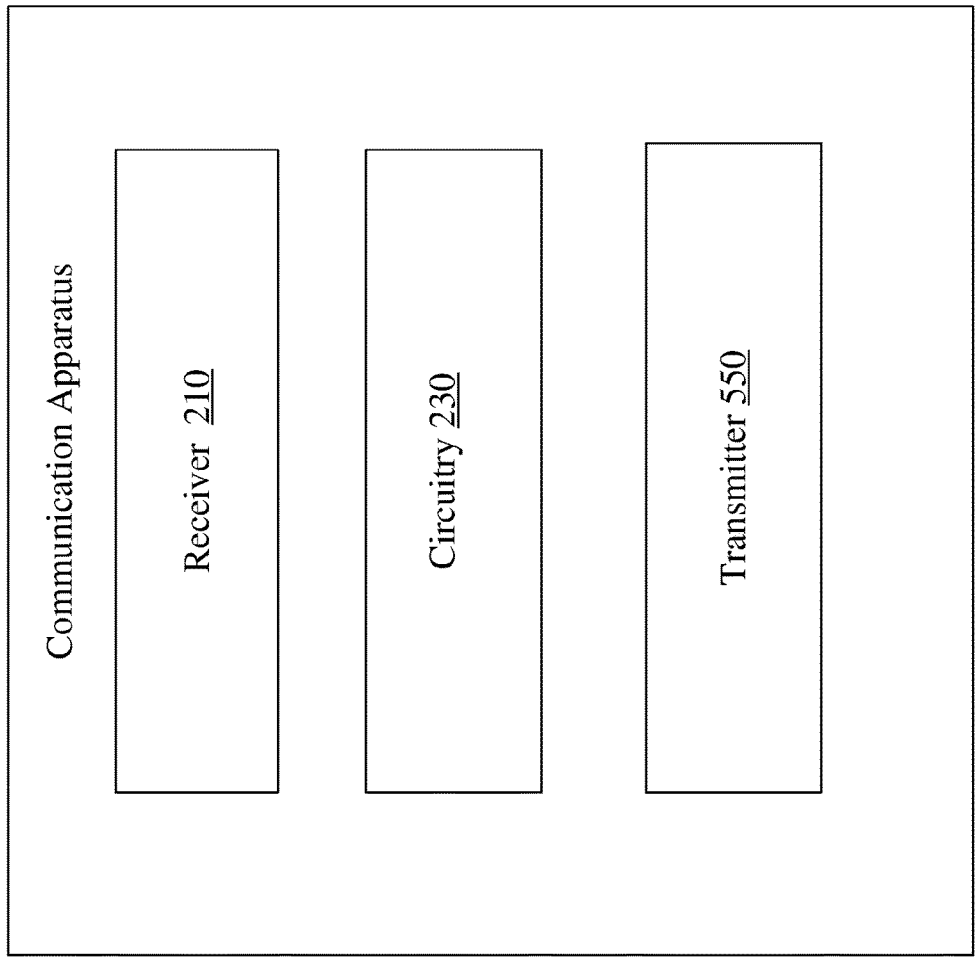
FIG. 5A schematically shows a block diagram of an example of a communication apparatus according to an embodiment of the present disclosure.

FIG. 5A schematically shows an example of a communication apparatus 500 according to an embodiment of the present disclosure.

The communication apparatus 500 includes a receiver 210, circuitry 230, and a transmitter 550. In one embodiment, the communication apparatus 500 may be a remote UE shown in FIG. 1A for receiving signaling and data (e.g., user data) from the relay UE via sidelink. Elements having similar functions as FIG. 2A are labeled the same and will not be repetitively described herein for purpose of brevity and clarity.

In one embodiment, the receiver 210 is operative to receive, in a first time period, multiple transport blocks (TBs) transmitted from another communication apparatus, and the circuitry 230 is operative to generate multiple feedback bits respectively for the received TBs, and perform at least one of multiplexing and bundling on at least a part of the feedback bits according to the number of the feedback bits to generate feedback information.

The transmitter 550 shown in FIG. 5A transmits the feedback information according to a timing for transmitting the feedback information, and in an embodiment, the circuitry 230 determines the timing for transmitting the feedback information.

In one embodiment, the timing for transmitting the feedback information by the communication apparatus 500 represents a subframe in which the feedback information is transmitted in a time domain or a physical resource on which the feedback information is transmitted in a frequency domain. The operations for determining the timing for transmitting the feedback information and transmitting the feedback information according to the timing will be described with reference to FIGS. 6-9.

Figure 5B:
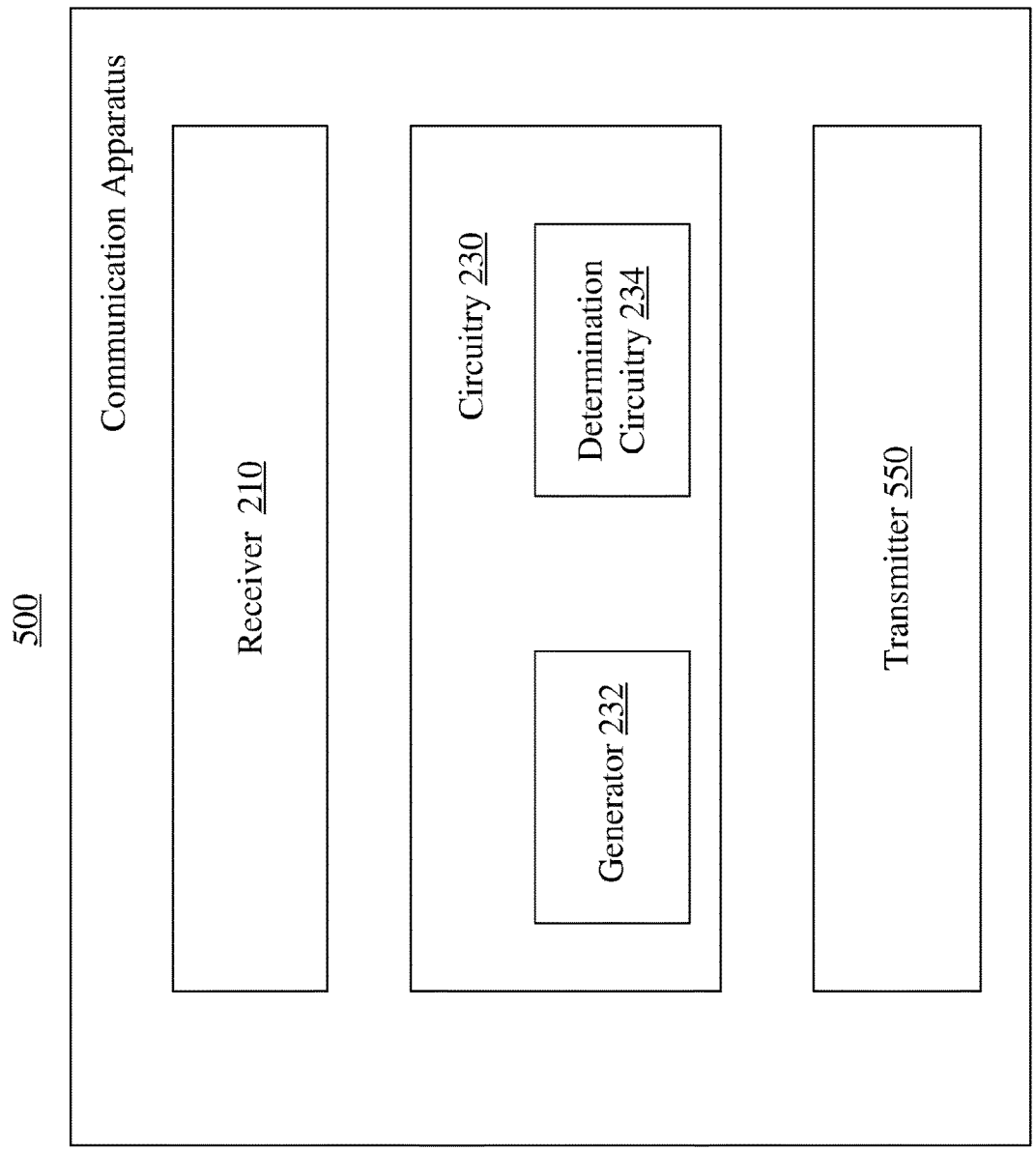
FIG. 5B schematically shows a block diagram of an example of a communication apparatus according to an embodiment of the present disclosure.

FIG. 5B schematically shows a block diagram of an example of a communication apparatus 500 according to an embodiment of the present disclosure. The communication apparatus 500 includes a receiver 210, a circuitry 230, and a transmitter 230. The circuitry 230 may include a generator 232 and a determination circuitry 234. Elements having similar functions as FIG. 5A are labeled the same and will not be repetitively described herein for purpose of brevity and clarity.

The operations of the receiver 210 and the generator 232 has been described with reference to FIGS. 4A-4C, therefore, the details thereof are omitted for the purpose of clarity and brevity.

In one embodiment, the determination circuitry 234 of the circuitry 230 determines the timing for transmitting the feedback information according to indicated information in a scheduling assignment (SA) received within a first SA resource pool in the first time period. In one embodiment, the first time period is the SA period, and the receiver 210 receives a scheduling assignment (SA, shown as blocks filled with dots in FIG. 3) within the SA resource pool and receives multiple transport blocks (TBs, shown as unfilled blocks in FIG. 3) within a data resource pool. In one embodiment, the receiver 210 receives the SA in a format of sidelink control information (SCI), and a field of the SCI includes indicated information explicitly indicating the timing, and the determination circuitry 234 of the circuitry 230 determines the timing for transmitting the feedback information according to indicated information.

Figure 6:
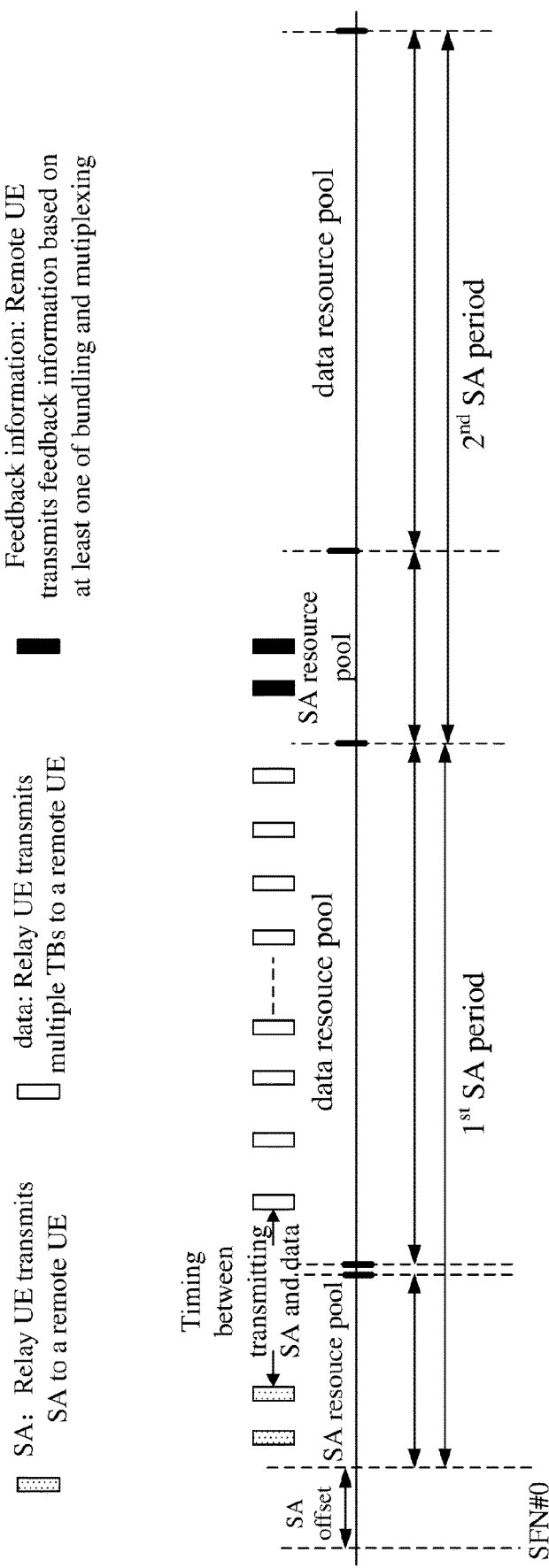
FIG. 6 schematically shows an example of an operation for determining a timing for transmitting feedback information, and transmitting feedback information according to the timing, in an embodiment of the present disclosure.

Referring to FIG. 6, if a field of the SCI received within the SA resource pool includes indicated information indicating the timing is within a subframe set of a second SA resource pool in a second time period after the first time period, the transmitter 550 transmits the feedback information (shown as black blocks in FIG. 6) in a format of sidelink control information (SCI) within the second SA resource pool according to the timing. For example, the SCI format may include a field of HARQ Acknowledge (HARQ-ACK) or a field of decoding status representative of the feedback information. Accordingly, the transmitter 550 transmits the feedback information in a format of SCI within the second SA resource pool in the second time SA period.

Advantageously, by indicating the timing explicitly in SA, the flexibility of determining the timing for transmitting the feedback information by the communication apparatus is improved. Moreover, the transmitter 550 transmits the feedback information within the SA resource pool in a format of SCI, therefore, there is no need to specify a physical feedback layer, and the compatibility of the communication can be improved therefore.

In another embodiment, the determination circuitry 234 of the circuitry 230 determines the timing according to an index of at least one of a subframe and a physical resource block (PRB) of a first SA resource pool allocated to the TBs that are received in the first time period. In an embodiment, the determination circuitry 234 of the circuitry 230 may determine the timing according to the index, and map the index i (i is an integer) of at least one of the subframe and the PRB of the first SA resource pool into a mapping index j (j is an integer) of a PRB of a resource pool for starting to transmit the feedback information according to a relationship, e.g., j=i+n; n is an integer. In one embodiment, the determination circuitry 234 may determine the timing is within a subframe set of a second SA resource pool in a second time period after the first time period according to the index, determines a mapping index of a PRB according to the mapping relationship, and transmits the feedback information in PRBs starting with the mapping index of the second SA resource pool.

For example, referring to FIG. 6, if the another communication apparatus starts to transmit the SA in subframe #0 with an index of 0 in the first SA period, the determination circuitry 234 of the circuitry 230 determines the timing is within a subframe set of a second SA resource pool in a second time period after the first time period according to the index, and the transmitter 550 transmits the feedback information (shown as black blocks in FIG. 6) starting from the PRB #1 with mapping index of 1 of the second SA resource pool, and the mapping index is obtained according to the mapping relationship, e.g., j=i+n; n=1. The transmitter 550 transmits the feedback information in a format of SCI. In an embodiment, the SCI format may include a field of HARQ-ACK or a field of decoding status representative of the feedback information. Accordingly, the transmitter 550 transmits the feedback information in a format of SCI within the second SA resource pool in the second time SA period.

Advantageously, by implicitly indicating the timing according to an index of at least one of a subframe and a physical resource block (PRB) allocated to the received TBs, SA overhead can be saved. Moreover, the transmitter 550 transmits the feedback information within the SA resource pool in a format of SCI, so there is no need to specify a physical feedback layer, and the compatibility of the communication can be improved.

In another embodiment, the determination circuitry 234 of the circuitry 230 determines the timing is within a subframe set of a data resource pool for transmitting data, and wherein the transmitter 550 transmits data carrying the feedback information in a format of media access control (MAC) control element (CE) within the data resource pool according to the timing.

Figure 7:
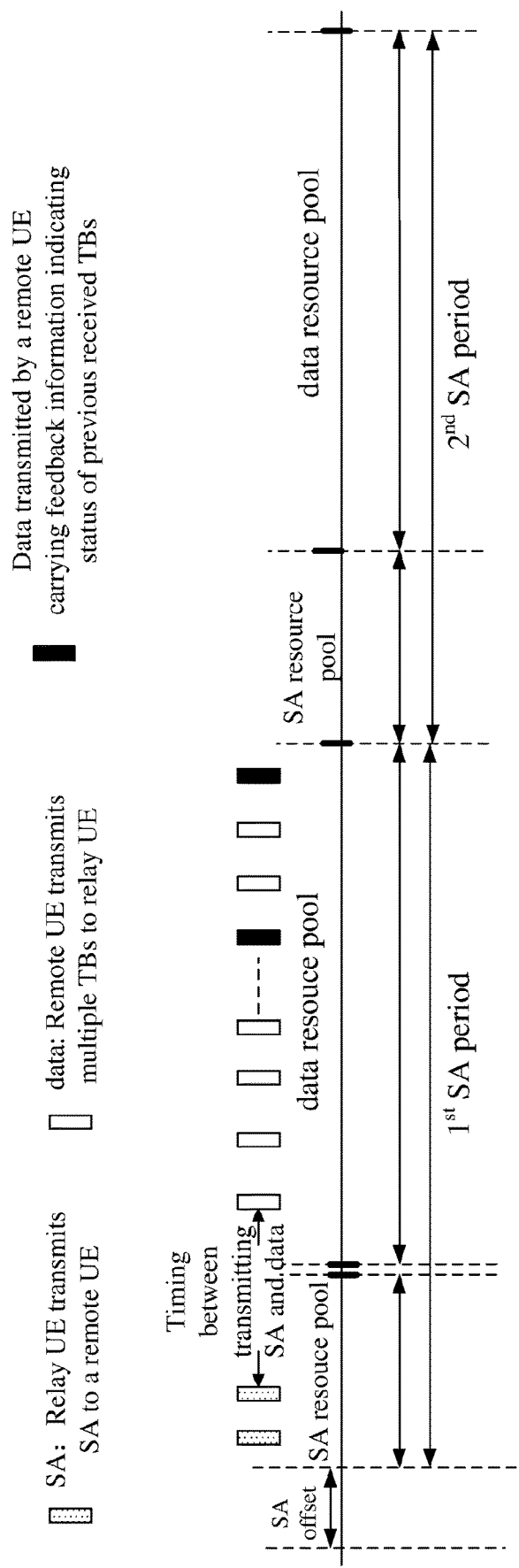
FIG. 7 schematically shows an example of an operation for determining a timing for transmitting feedback information, and transmitting the feedback information according to the timing, in another embodiment of the present disclosure.

Referring to FIG. 7, in an embodiment, the communication apparatus 500 receives, in the first time period, a SA within the SA resource pool and TBs within the data resource pool transmitted by another communication apparatus (e.g., an external transmitter). At the same time, the communication apparatus 500 may transmit data to the external transmitter via sidelink within the data resource pool. And the data transmitted by the communication apparatus 500 may carry feedback information indicating a status of received TBs. Accordingly, the determination circuitry 234 of the circuitry 230 determines the timing is within a subframe set of the data resource pool for transmitting data, and the transmitter 550 transmits the data carrying the feedback information (shown as black blocks in FIG. 7) in a format of media access control (MAC) control element (CE) within the data resource pool according to the timing. In one embodiment, the MAC CE may include a HARQ-ACK or a field of decoding status indicating status of the received TBs in a previous SA time period.

Advantageously, by transmitting feedback information with data within the data resource pool, SA overhead can be saved. Moreover, as the transmitter 550 transmits the feedback information within the data resource pool in a format of MAC CE, there is no need to specify a physical feedback layer, and the compatibility of the communication can be improved.

In an embodiment, a feedback resource pool may be configured or preconfigured for the feedback channel. The determination circuitry 234 of the circuitry 230 may determine the timing for transmitting the feedback information is within a subframe set of the feedback resource pool. In an embodiment, at least one transmission PRB of the feedback resource pool for transmitting the feedback information may be indicated by a first scheduling assignment (SA) received in the first time period.

In an embodiment, the transmission PRB of the feedback resource pool for transmitting the feedback information is indicated by indicating information in the SA received in the first SA period. The receiver 210 of the communication apparatus 500 receives the SA in a format of SCI, which includes a field indicating the at least one transmission PRB of the feedback resource pool.

In another embodiment, the at least one transmission PRB of the feedback resource pool is indicated implicitly by the SA received in the first SA period. For example, the transmission PRB of the feedback resource pool is indicated according to an index of at least one of a subframe and a physical resource block (PRB) allocated to the TBs received in the first time period. For example, the index p (p is an integer) of the at least one of a subframe and a physical resource block (PRB) may be mapped into an index q (q is an integer) of the transmission RPB according to a relationship, e.g., q=p+d (d is an integer).

Figure 8A:
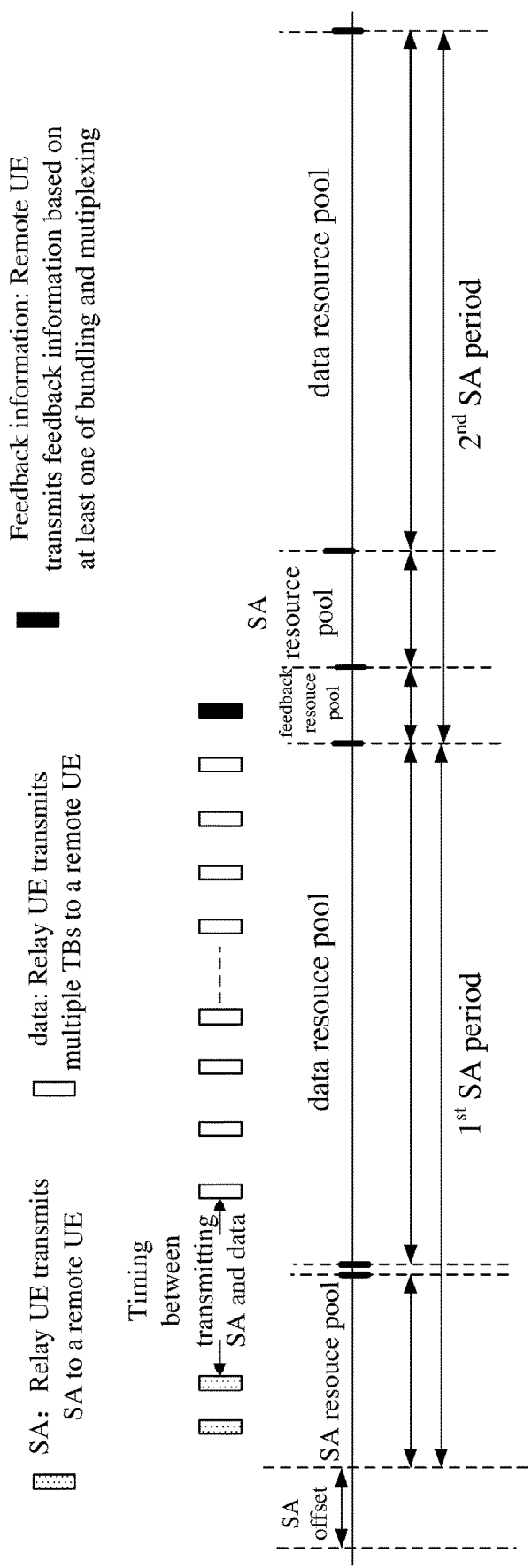
FIGS. 8A-8B schematically show examples of operations for determining a timing for transmitting feedback information, and transmitting the feedback information according to the timing, in another embodiments of the present disclosure.

Referring the FIG. 8A, the feedback resource pool is configured or preconfigured following a data resource pool in the first SA period, that is, multiple PRBs of the second SA resource pool in a second time period after the first time period are configured or preconfigured as the feedback resource pool. The determination circuitry 234 determines the timing is within the subframe set of the feedback resource pool, and the indicating information in the SA received in the first SA period indicates the at least one transmission PRB of the feedback resource pool. The transmitter 550 transmits the feedback information (shown as black blocks in FIG. 8A) in a format of sidelink control information (SCI) within the feedback resource pool in the at least one transmission PRB. In one embodiment, the SCI may include a HARQ-ACK or a field of decoding status indicating status of the received TBs in a previous time period.

Figure 8B:
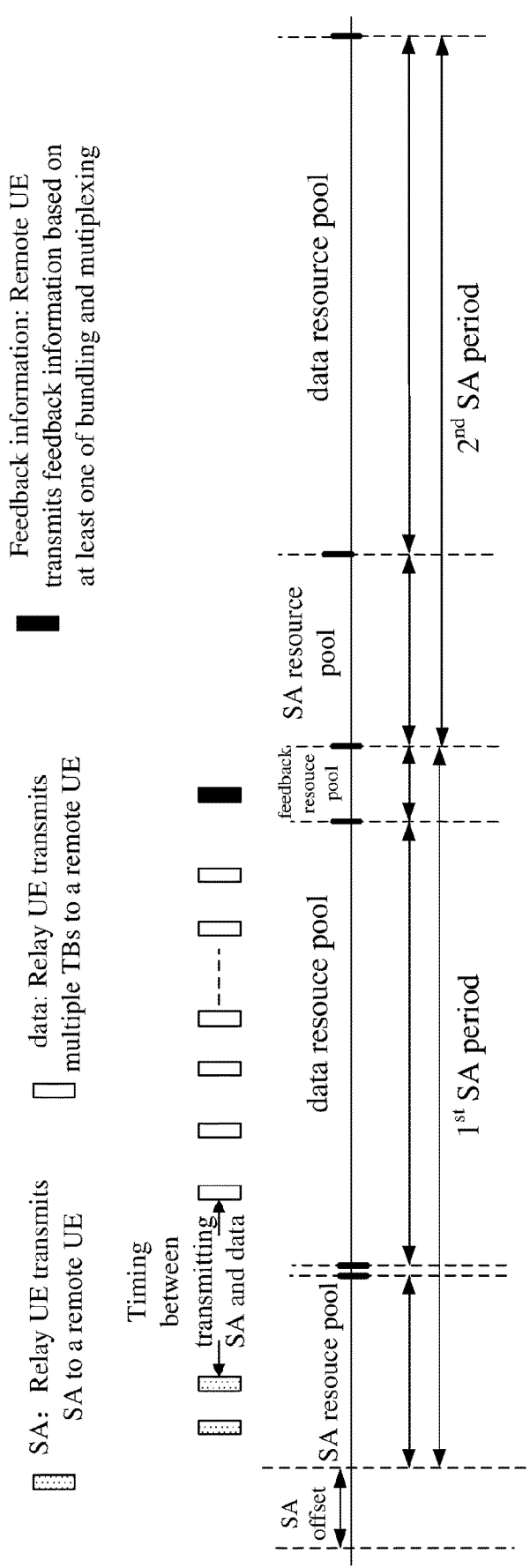

Referring to the FIG. 8B, the feedback resource pool is configured or preconfigured following a data resource pool at the end of the first SA period. That is, multiple PRBs of the data resource pool in the first SA period are configured or preconfigured as the feedback resource pool. The determination circuitry 234 determines the timing is within the subframe set of the feedback resource pool, and an index of at least one of a subframe and a physical resource block (PRB) allocated to the TBs received in the first time period indicates the transmission PRB of the feedback resource pool. For example, the index p (p is an integer) of the at least one of a subframe and a physical resource block (PRB) may be mapped into an index q (q is an integer) of the transmission RPB according to a relationship, e.g., q=p+d (d is an integer). The transmitter 550 transmits the feedback information (shown as black blocks in FIG. 8B) in a format of MAC CE within the feedback resource pool in the at least one transmission PRB in the first SA period. In one embodiment, the MAC CE may include a HARQ-ACK or a field of decoding status indicating status of the received TBs in a previous time period.

Advantageously, by configuring or preconfiguring a feedback resource pool for the feedback channel, the feedback channel can be protected and the reliability of communication can be improved.

In another embodiment, multiple fixed PRBs of a SA resource pool are allocated for transmitting the feedback information, and the transmitter 550 transmits the feedback information in a format of SCI in the fixed PRBs within the scheduling assignment resource pool.

Figure 9:
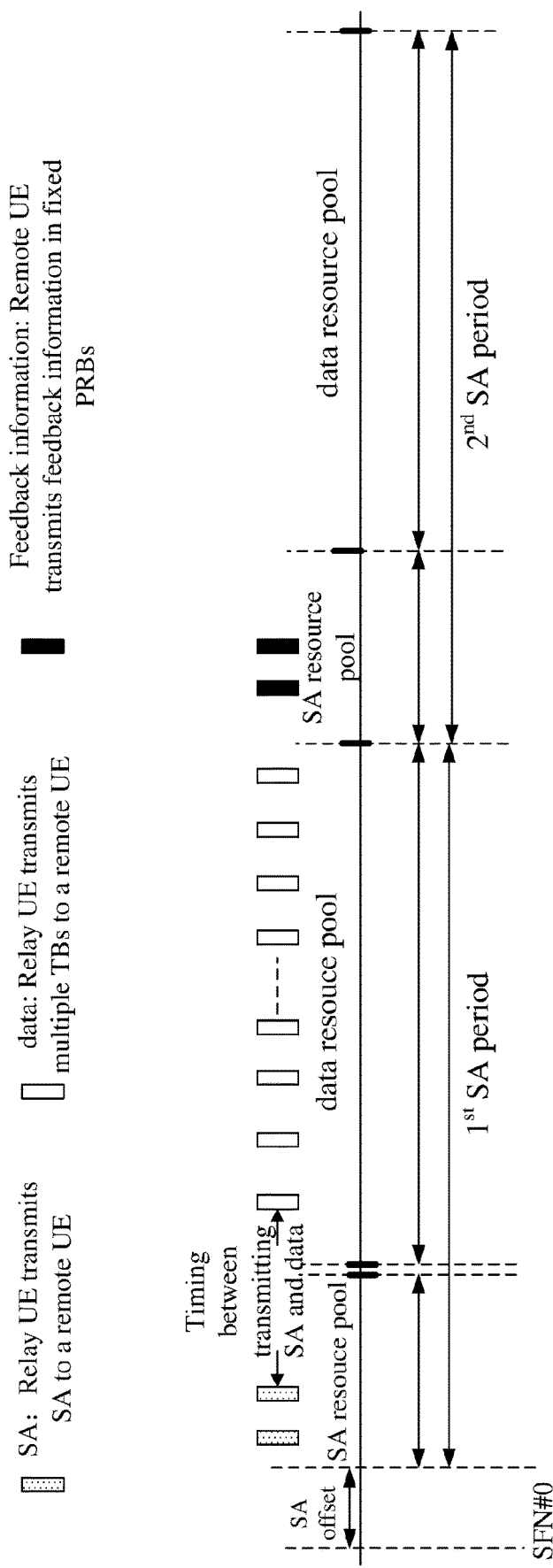
FIG. 9 schematically shows an example of an operation for determining a timing for transmitting feedback information and transmitting the feedback information according to the timing, in another embodiment of the present disclosure.

Referring to FIG. 9, multiple fixed PRBs (e.g., the PRBs in the first two subframes) of a second SA resource pool is allocated for transmitting the feedback information (shown as black blocks in FIG. 9), and the transmitter 550 transmits the feedback information in the format of SCI in the fixed PRBs in the second SA period. The SCI may include a HARQ-ACK or a field of decoding status indicating status of the received TBs in a previous time period.

Advantageously, by allocating fixed PRB for transmitting the feedback information, the frequency/timing of feedback is determined, so there is no need to explicitly indicate in SA, which can save SA overhead. And as there is no need to specify a physical feedback layer, the compatibility of the communication can be improved.

Figure 10:
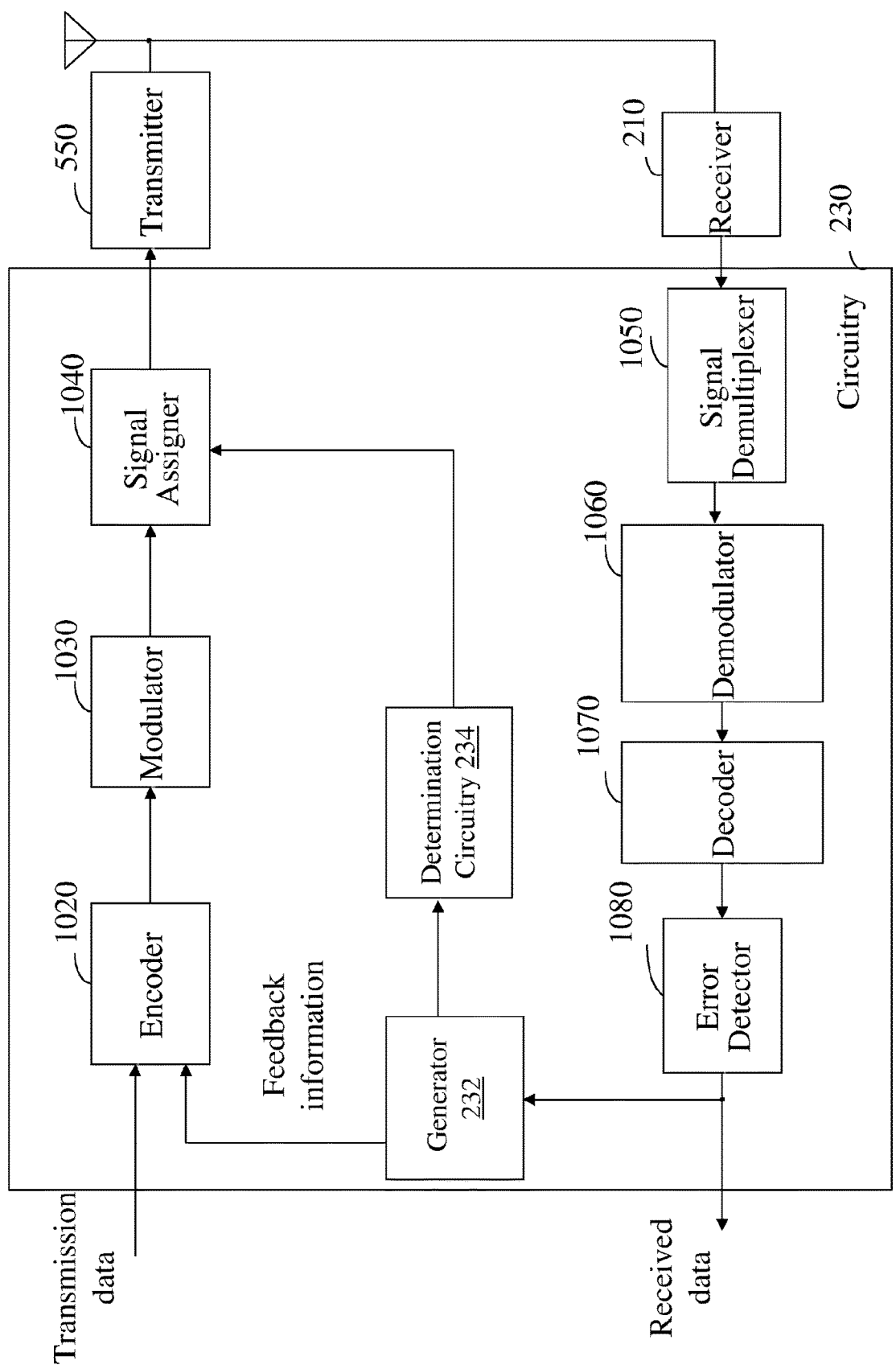
FIG. 10 schematically shows a block diagram illustrating details of the communication apparatus according to an embodiment of the present invention.

FIG. 10 schematically shows a block diagram illustrating details of an example of the communication apparatus 500 according to an embodiment of the present invention. The communication apparatus 500 may include a receiver 210, a circuitry 230, and a transmitter 550. Elements having similar functions as FIG. 5B are labeled the same and will not be repetitively described herein for purpose of brevity and clarity.

The circuitry 230 of the communication apparatus 500 may include an encoder 1020, a modulator 1030, a signal assigner 1040, a signal demultiplexer 1050, a demodulator 1060, a decoder 1070, an error detector 1080, a generator 232, and a determination circuitry 234.

Of these constituent elements, transmitter 550 functions mainly as the transmitter 550 shown in FIGS. 5A-5B, circuitry 230 functions mainly as the circuitry 230, and the receiver 210 functions mainly as the receiver 210 shown in FIGS. 5A-5B. To avoid having the description become complex, in this case, the constituent elements related to the transmission of feedback information, which are closely connected with the features of the present embodiment, are mainly shown.

The receiver 210 receives data from the antenna. For example, the receiver 210 is operative to receive, in a first time period, a plurality of transport blocks (TBs) transmitted from another communication apparatus.

The signal demultiplexer 1050 demultiplexes the received data by Fast Fourier Transform (FFT) and sends the demultiplexed data to the demodulator 1060. The demodulator 1060 demodulated the demultiplexed data to generate demodulated data. The decoder 1070 decodes the demodulated data, and the error detector 1080 perform checking procedure (e.g., Cyclic Redundancy Check, CRC) to check the received data.

In one embodiment, the error detector 1080 sends the received data to the generator 232 for generating feedback information. The generator 232 may generate multiple feedback bits respectively for the received TBs, perform at least one of multiplexing and bundling on at least a part of feedback bits according to the number of the feedback bits. The detailed operation of the generator 232 for generating the feedback information has been described in detail with reference to FIGS. 4A-4C, therefore, the details thereof are omitted for the purpose of clarity and brevity.

The encoder 1020 encodes the feedback information as well as the transmission data to obtain the encoded signal, the modulator 1030 modulates the encoded signal to obtain the modulated signal, the signal assigner 1040 assigns resources for the modulated signal, and the transmitter 550 transmits the signal including data and the feedback information. In one embodiment, the determination circuitry 234 of the circuitry 230 determines a timing for transmitting the feedback information according to embodiments of the present invention (the detailed operation for determining the timing has been described with reference to FIGS. 6-9, therefore, the details thereof are omitted for the purpose of clarity and brevity), and the signal assigner 1040 maps the feedback information to a resource according to the timing determined by the determination circuitry 234. Therefore, the transmitter 550 transmits the feedback information according to the timing.

To be noted that although FIG. 10 shows the parts, i.e., the encoder 1020, the modulator 1030, the signal assigner 1040, the signal demultiplexer 1050, the demodulator 1060, the decoder 1070, and the error detector 1080 are within the circuitry 230, this is only an example, but not a limitation, in fact, for example, one or more of the integrated parts may be separated from the circuitry 230 depending on requirements of the communication apparatus.

To be noted that although FIG. 10 shows the generator 232 and determination circuitry 234 in separate units, this is only an example, but not a limitation. For example, they may be within a unit or integrated with each other as an integrated circuit, or they may be in other forms.

Figure 11:
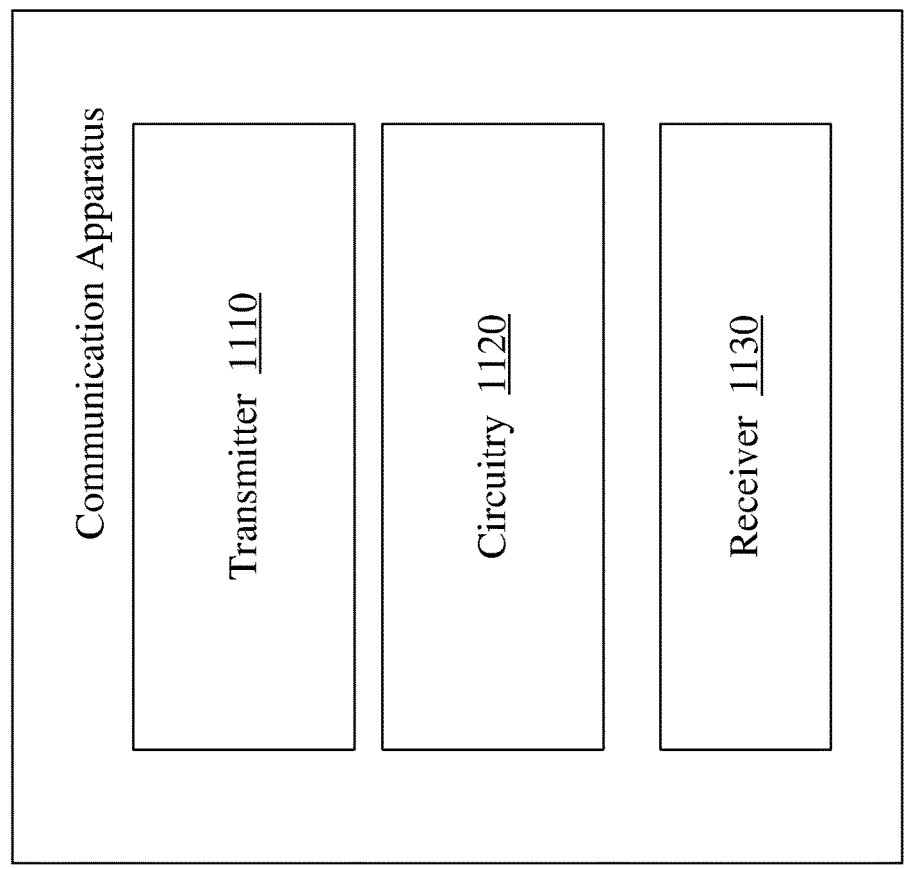
FIG. 11 schematically shows a block diagram of an example of a communication apparatus according to an embodiment of the present disclosure.

FIG. 11 schematically shows a block diagram of an example of a communication apparatus 1100 according to an embodiment of the present disclosure. In one embodiment, the communication apparatus 1100 may be a relay UE shown in FIG. 1A for transmitting signaling and data (e.g., user data) to another communication apparatus, e.g., a remote UE via sidelink.

Referring to FIG. 11, the communication apparatus 1100 includes a transmitter 1110, circuitry 1120, and a receiver 1130. The transmitter 1110 transmits multiple transmit blocks (TBs) to another communication apparatus. The receiver 1130 receives the feedback information from the another communication apparatus, and the circuitry 1120 controls the transmitter 1110 to retransmit a part of the TBs which have been previously transmitted to the another communication apparatus in response to feedback information, wherein the feedback information is generated by the another communication apparatus by performing at least one of multiplexing and bundling on at least a part of a plurality of feedback bits according to the number of the feedback bits, and wherein the feedback bits are respectively generated for the TBs received by the another communication apparatus in a first time period.

In one embodiment, the another communication apparatus may be the communication apparatus 500 shown in FIG. 5B.

In one embodiment, when the number of the feedback bits in the first time period is greater than a payload size of a feedback channel, the circuitry 230 of the another communication apparatus 500 bundles a first part of the feedback bits to generate a bundled feedback bit, multiplexes a second part of feedback bits to generate multiplexed feedback bits, and combines the bundled feedback bit and the multiplexed feedback bits to generate the feedback information. The operation of generating the feedback information has been described with reference to FIG. 4A, therefore, the details thereof are omitted for the purpose of clarity and brevity.

The transmitter 1110 receives the feedback information from the feedback channel, and the number of bits received from the feedback channel is not greater than the payload size of the feedback channel.

In another embodiment, when the number of the feedback bits is greater than a payload size of a feedback channel, the generator 232 of the circuitry 230 in the another communication apparatus 500 bundles all of the feedback bits in a unit of at least two feedback bits to generate the feedback information. The operation of generating the feedback information has been described with reference to FIG. 4B, therefore, the details thereof are omitted for the purpose of clarity and brevity.

The transmitter 1110 receives the feedback information from the feedback channel, and the number of the bits received from the feedback channel is not greater than the payload size of the feedback channel.

In another embodiment, if the number of the feedback bits is not greater than a payload size of a feedback channel, the generator 232 of the circuitry 230 of the another communication apparatus 500 multiplexes the feedback bits to generate the feedback information. The operation of generating the feedback information has been described with reference to FIG. 4C, therefore, the details thereof are omitted for the purpose of clarity and brevity.

Advantageously, by performing at least one of multiplexing and bundling on the feedback bits according to the number of the feedback bits to generate feedback information, unnecessary retransmission can be avoided, the communication delay can be decreased, and the communication performance and the flexibility of the feedback can be greatly improved.

In an embodiment, the another communication apparatus transmits the feedback information according to a timing.

More specifically, the determination circuitry 234 of the circuitry 230 in the another communication apparatus 500 may determine the timing according to indicated information in a scheduling assignment received within a first scheduling assignment resource pool in the first time period. Alternatively, the determination circuitry 234 of the circuitry 230 in the another communication apparatus 500 may determine the timing according to an index of at least one of a subframe and a physical resource block (PRB) of a first scheduling assignment resource pool allocated to the received TBs.

When the determination circuitry 234 of the another communication apparatus 500 determines the timing is within a subframe set of a second scheduling assignment resource pool in a second time period after the first time period, the transmitter 550 of the another communication apparatus 550 is operative to transmit the feedback information in a format of sidelink control information (SCI) within the second scheduling assignment resource pool according to the timing. The operation for determining the timing for transmitting the feedback information and transmitting the feedback information has been described with reference to FIG. 6, and the details thereof are omitted for the purpose of clarity and brevity.

Advantageously, for the communication apparatus 1100 (e.g., the relay UE), by receiving the feedback information within the SA resource pool in a format of SCI, there is no need to specify a physical feedback layer, and the compatibility of the communication can be improved thereof.

In one embodiment, the determination circuitry 234 of the circuitry 230 in the another communication apparatus 500 may determine the timing is within a subframe set of a data resource pool for transmitting data, and wherein the transmitter 550 of the another communication apparatus 500 is operative to transmit the data carrying the feedback information in a format of media access control (MAC) control element (CE) within the data resource pool according to the timing. The operation for determining the timing for transmitting the feedback information and transmitting the feedback information has been described with reference to FIG. 7, and the details thereof are omitted for the purpose of clarity and brevity.

Advantageously, for the communication apparatus 1100 (e.g., the relay UE), by receiving data with feedback information within the data resource pool, SA overhead can be saved. Moreover, since there is no need to specify a physical feedback layer, the compatibility of the communication can be improved.

In one embodiment, a feedback resource pool is configured or preconfigured for the feedback channel, the determination circuitry 234 of the circuitry 230 in the another communication apparatus 500 may determine the timing is within a subframe set of a feedback resource pool. At least one transmission PRB of the feedback resource pool for transmitting the feedback information may be indicated by a first scheduling assignment (SA) received by the receiver 210 of the another communication apparatus 500 in the first time period.

For example, when multiple physical resource blocks (PRBs) of a scheduling assignment resource pool in a second time period after the first time period are configured or preconfigured as the feedback resource pool, the transmitter 550 of the another communication apparatus 500 transmits the feedback information in a format of sidelink control information (SCI) in the at least one transmission PRB within the feedback resource pool PRB. When multiple PRBs of a data resource pool in the first time period are configured or preconfigured as the feedback resource pool, the transmitter 550 of the another communication apparatus 500 transmits feedback information in a format of MAC CE in the at least one transmission PRB within the feedback resource pool. The operations for determining the timing and transmission PRBs and transmitting the feedback information have been described with reference to FIGS. 8A-8B, and the details thereof are omitted for the purpose of clarity and brevity.

Advantageously, by configuring or preconfiguring a feedback resource pool for the feedback channel, the feedback channel can be protected and the reliability of communication can be improved.

In another embodiment, multiple fixed PRBs of a scheduling assignment resource pool are allocated for transmitting the feedback information, and the transmitter 550 of the another communication apparatus 500 may transmit the feedback information in a format of sidelink control information (SCI) in the fixed PRBs within the scheduling assignment resource pool. The operation for determining the timing for transmitting the feedback information and transmitting the feedback information has been described with reference to FIG. 9, and the details thereof are omitted for the purpose of clarity and brevity.

Advantageously, by allocating fixed PRB for transmitting the feedback information, the frequency/timing of feedback is determined, so there is no need to explicitly indicate in SA, which can save SA overhead. And as there is no need to specify a physical feedback layer, the compatibility of the communication can be improved accordingly.

Figure 12:
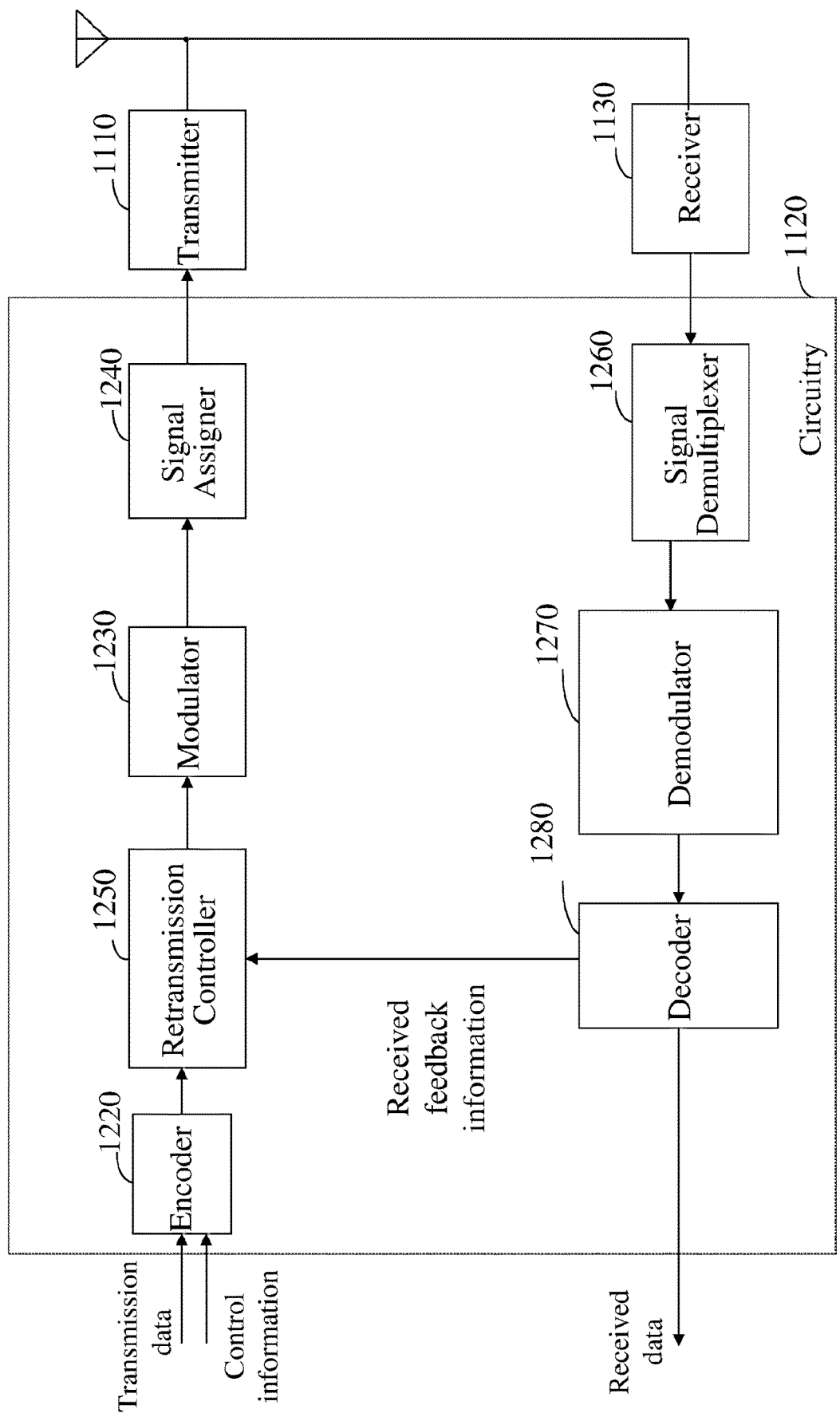
FIG. 12 schematically shows a block diagram illustrating details of the communication apparatus according to an embodiment of the present invention.

FIG. 12 schematically shows a block diagram illustrating details of the communication apparatus 1100 according to an embodiment of the present invention. The communication apparatus 1100 may include a transmitter 1110, a circuitry 1120, and a receiver 1130. Elements having similar functions as FIG. 11 are labeled the same and will not be repetitively described herein for purpose of brevity and clarity.

In one embodiment, the circuitry 1120 of the communication apparatus 1100 may include an encoder 1220, a modulator 1230, a signal assigner 1240, a retransmission controller 1250, a signal demultiplexer 1260, a demodulator 1270, and a decoder 1280.

Of these constituent elements, transmitter 1110 functions mainly as the transmitter 1110 shown in FIG. 11, circuitry 1120 functions mainly as the circuitry 1120, and the receiver 1130 functions mainly as the receiver 1130 shown in FIG. 11. To avoid having the description become complex, in this case, the constituent elements related to the retransmission in response to the feedback information, which are closely connected with the features of the present embodiment, are mainly shown.

The receiver 1130 receives data and feedback information transmitted by the another communication apparatus (e.g., the communication apparatus 500 shown in FIG. 10) via the antenna. The detailed operations of generating the feedback information and transmitting the feedback information by the another communication apparatus 500 have been described in detail above, and the details thereof are omitted for the purpose of clarity and brevity.

The signal demultiplexer 1260 demultiplexes the received data and feedback information to generate demultiplexed signal and sends the demultiplexed signal to the demodulator 1270. The demodulator 1270 demodulated the demultiplexed signal to generate demodulated signal. The decoder 1280 decodes the demodulated signal to recover the received data and feedback information.

In one embodiment, the decoder 1280 sends the received feedback information to the retransmission controller 1250 for controlling retransmission of a part of transport blocks (TBs). The retransmission controller 1250 is coupled to the encoder 1220. The encoder 1220 receives transmission data and control information. In one embodiment, the control information indicates resource allocation information, feedback method and so on. The encoder 1220 encodes transmission data and control information to obtain encoded data and control information. The retransmission controller 1250 is coupled to the encoder 1220 and outputs the encoded data to the modulator 1230 according to the received feedback information from the decoder 1280. For example, when the feedback information indicates that the TB has been successfully received, i.e. "ACK", the retransmission controller 1250 flush the encoded data stored as the previous transmission data and outputs the encoded data as a new transmission data from the encoder 1220, and when the feedback information indicates that the TB has not been successfully received, i.e. "NACK", the retransmission controller 1250 outputs the encoded data stored as a retransmission data, which may have a different redundancy from that of the previous transmission data.

The modulator 1230 modulates the encoded data and encoded control information to obtain the modulated data and modulated control information, the signal assigner 1240 assigns resources for the modulated data and control information, and the transmitter 1110 transmits the data and the control information to the communication apparatus (e.g., communication apparatus 500 shown in FIG. 10).

To be noted that, although FIG. 12 shows the parts, i.e., the encoder 1220, the modulator 1230, the signal assigner 1240, the retransmission controller 1250, the signal demultiplexer 1260, the demodulator 1270, and the decoder 1280 are within the circuitry 1120, this is only an example, but not a limitation, in fact, for example, one or more of the integrated parts may be separated from the circuitry 1120 depending on requirements of the communication apparatus.

Figure 13:
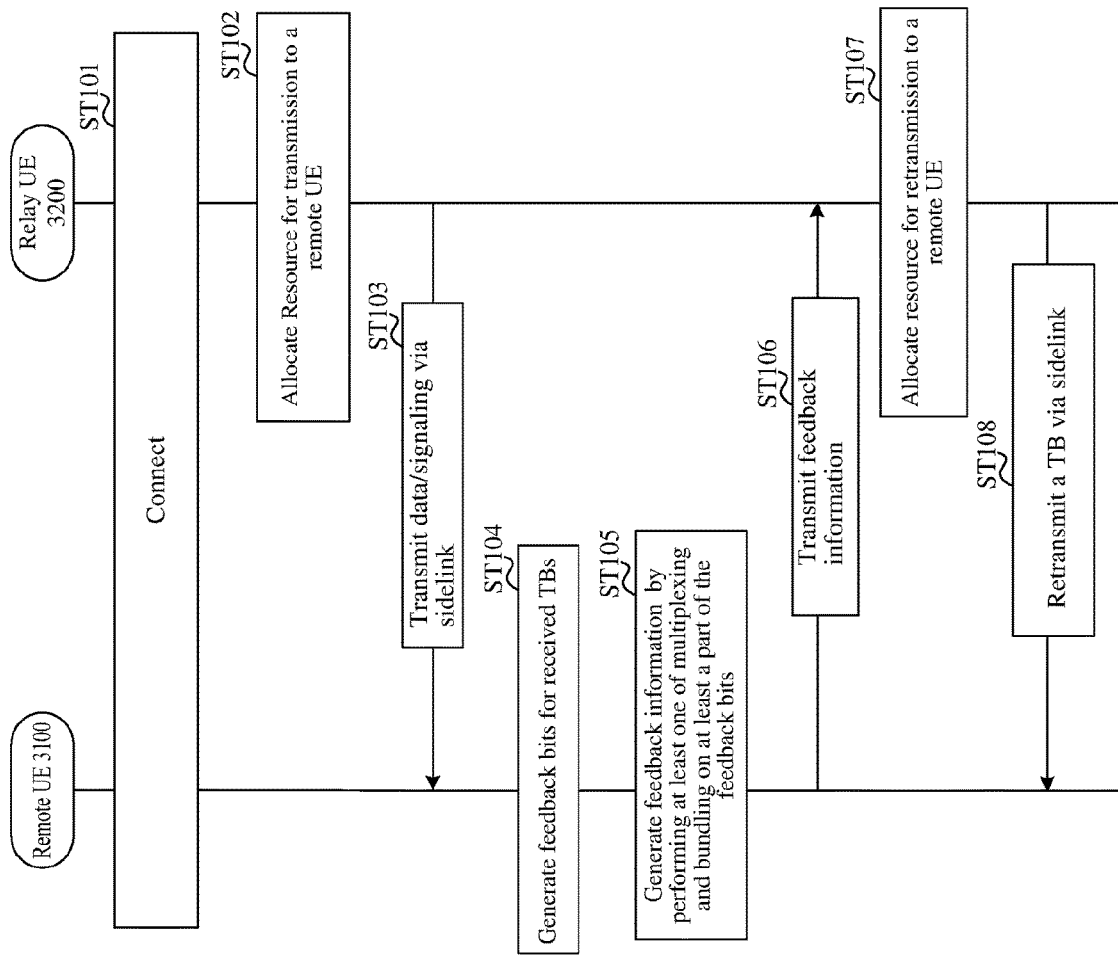
FIG. 13 schematically shows an example of a flowchart of communication between a communication apparatus and another communication apparatus via sidelink according to an embodiment of the present disclosure.

FIG. 13 schematically shows an example of a flowchart of communication between a first communication apparatus and another communication apparatus via sidelink according to an embodiment of the present disclosure. In an embodiment, the communication apparatus may be a relay UE 3200, and the another communication apparatus may be a remote UE 3100. The remote UE 3100 may include a receiver 210, circuitry 230 and a transmitter 550 as described with reference to FIGS. 5A-5B, wherein the circuitry 230 includes a generator 232 and determination circuitry 234, and the relay UE 3200 may include a transmitter 1110, circuitry 1120, and a receiver 1130 as described with reference to FIG. 11.

As step 101, the relay UE 3200 connects with the remote UE 3100 in a connection procedure. The connection may be established by implementing known or future developed method whose details are omitted herein.

At step ST102, the relay UE 3200 allocates resource (e.g., physical resource blocks, PRBs) for transmission to the remote UE 3100.

At step ST103, the relay UE 3200 transmits the data (transport blocks, TBs) and signaling to the remote UE 3100. More specifically, the relay UE 3200 transmits scheduling assignment (SA) within a SA resource pool and transmits TBs within a data resource pool, and the remote UE 3100 receives the SA within a SA resource pool and receives TBs within a data resource pool in different time periods (SA time periods).

At step ST104, the generator 232 of the circuitry 230 in the remote UE 3100 generates multiple feedback bits respectively for the received TBs. Each feedback bit indicates a status of the corresponding received TB.

At step ST105, the generator 232 of the circuitry 230 in the remote UE 3100 generates the feedback information by performing at least one of multiplexing and bundling on at least a part of the feedback bits according to the number of the feedback bits. The operations for generating the feedback information have been described above in detail with reference to FIGS. 4A-4C, therefore, the details are omitted for the purpose of clarity and brevity.

At step ST106, the transmitter 550 of the remote UE 3100 transmits the feedback information to the relay UE 3200 via sidelink according to a timing. In one embodiment, the determination circuitry 234 of the circuitry 230 in the remote UE 3100 determines the timing for transmitting the feedback information. The operations for determining the timing for transmitting the feedback information and transmitting the feedback information according to the timing have been described in detail with reference to FIGS. 6-9, therefore, the details are omitted for the purpose of clarity and brevity.

At step ST107, the relay UE 3200 allocates resource (e.g., PRBs) for retransmission to the remote UE 3100. At step ST108, the relay UE 3200 retransmits a part of the TBs which have been previously transmitted to the remote UE 3100 to the remote UE 3100 according to the feedback information.

The steps ST101-ST108 may be repeatedly performed in each SA time period.

Figure 14:
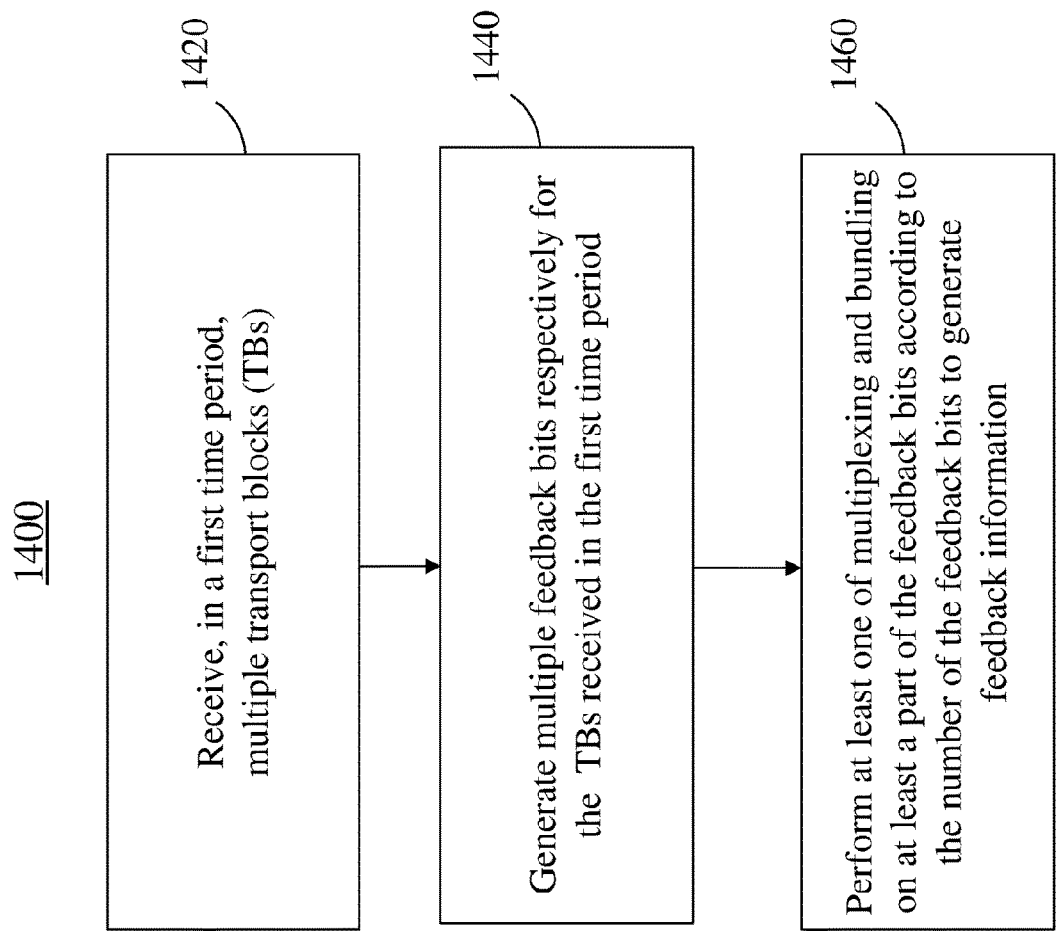
FIG. 14 schematically shows a flowchart of a communication method according to embodiments of the present invention.

FIG. 14 schematically shows a flowchart of a wireless communication method 1400 according to embodiments of the present invention.

The communication method for communicating via sidelink, includes: step 1420, receiving, in a first time period, multiple transport blocks (TBs) transmitted from another communication apparatus; step 1440, generating a plurality of feedback bits respectively for the TBs received in the first time period; and step 1460, performing at least one of multiplexing and bundling on at least a part of the feedback bits according to the number of the feedback bits to generate feedback information.

In an embodiment, when the number of the feedback bits generated for the TBs received in the first time period is greater than a payload size of a feedback channel, the step of performing at least one of multiplexing and bundling on at least a part of a plurality of feedback bits includes: bundling a first part of the feedback bits to generate a bundled feedback bit; multiplexing a second part of feedback bits to generate multiplexed feedback bits; and combining the bundled feedback bit and the multiplexed feedback bits to generate the feedback information transmitted in the feedback channel, wherein the number of bits transmitted in the feedback channel is not greater than the payload size of the feedback channel.

In an embodiment, when the number of the feedback bits is greater than a payload size of a feedback channel, the step of performing at least one of multiplexing and bundling on at least a part of a plurality of feedback bits includes: bundling all of the feedback bits in a unit of at least two feedback bits to generate the feedback information, wherein the number of the bits transmitted in the feedback channel is not greater than the payload size of the feedback channel.

In an embodiment, when the number of the feedback bits is not greater than a payload size of a feedback channel, the step of the performing at least one of multiplexing and bundling on at least a part of a plurality of feedback bits includes: multiplexing the plurality of feedback bits to generate the feedback information.

Advantageously, by performing at least one of multiplexing and bundling on the feedback bits according to the number of the feedback bits to generate feedback information, unnecessary retransmission can be avoided, the communication delay can be decreased, and the communication performance and the flexibility of the feedback can be greatly improved.

In an embodiment, the method further includes: determining a timing for transmitting the feedback information; and transmitting the feedback information according to the timing.

In an embodiment, the step of determining a timing for transmitting the feedback information includes: determining the timing according to indicated information in a scheduling assignment received within a first scheduling assignment resource pool in the first time period.

In an embodiment, the step of determining a timing for transmitting the feedback information includes: determining the timing according to an index of at least one of a subframe and a physical resource block (PRB) of a first scheduling assignment resource pool that are allocated to the TBs received in the first time period.

In an embodiment, when the timing is determined to be within a subframe set of a second scheduling assignment resource pool in a second time period after the first time period, the step of transmitting the feedback information includes: transmitting the feedback information in a format of sidelink control information (SCI) within the second scheduling assignment resource pool according to the timing.

Advantageously, by receiving the feedback information within the SA resource pool in a format of SCI, there is no need to specify a physical feedback layer, therefore, the compatibility of the communication can be improved.

In an embodiment, when timing is determined to be within a subframe set of a data resource pool for transmitting data, the step of transmitting the feedback information includes: transmitting the data carrying the feedback information in a format of media access control (MAC) control element (CE) within the data resource pool according to the timing.

Advantageously, by transmitting feedback information with data within the data resource pool, SA overhead can be saved. Moreover, there is no need to specify a physical feedback layer, therefore, the compatibility of the communication can be improved thereof.

In an embodiment, the communication method further includes: configuring or preconfiguring a feedback resource pool for the feedback channel, wherein the timing is determined to be within a subframe set of the feedback resource pool, and wherein at least one transmission PRB of the feedback resource pool for transmitting the feedback information is indicated by a first scheduling assignment received in the first time period.

In an embodiment, the step of configuring or preconfiguring a feedback resource pool for the feedback channel, includes: configuring or preconfiguring a plurality of PRBs of a scheduling assignment resource pool in a second time period after the first time period as the feedback resource pool, wherein the step of transmitting the feedback information communication method comprises: transmitting the feedback information in a format of sidelink control information (SCI) in the at least one transmission PRB within the feedback resource pool.

In an embodiment, the step of configuring or preconfiguring a feedback resource pool for the feedback channel, includes: configuring or preconfiguring a plurality of PRBs of a data resource pool in the first time period as the feedback resource pool, wherein the step of transmitting the feedback information includes: transmitting the feedback information in a format of MAC CE in the at least one transmission PRB within the feedback resource pool.

Advantageously, by configuring or preconfiguring a feedback resource pool for the feedback channel, the feedback channel can be better protected and the reliability of communication can be improved.

In an embodiment, the communication method further includes: determining a plurality of fixed PRBs of a scheduling assignment resource pool allocated for transmitting the feedback information, and wherein the step of transmitting the feedback information includes: transmitting the feedback information in a format of sidelink control information (SCI) in the fixed PRBs within the scheduling assignment resource pool.

Advantageously, by allocating fixed PRB for transmitting the feedback information, the frequency/timing of feedback is determined, so there is no need to explicitly indicate in SA, which can save SA overhead. And as there is no need to specify a physical feedback layer, the compatibility of the communication is improved.

Figure 15:
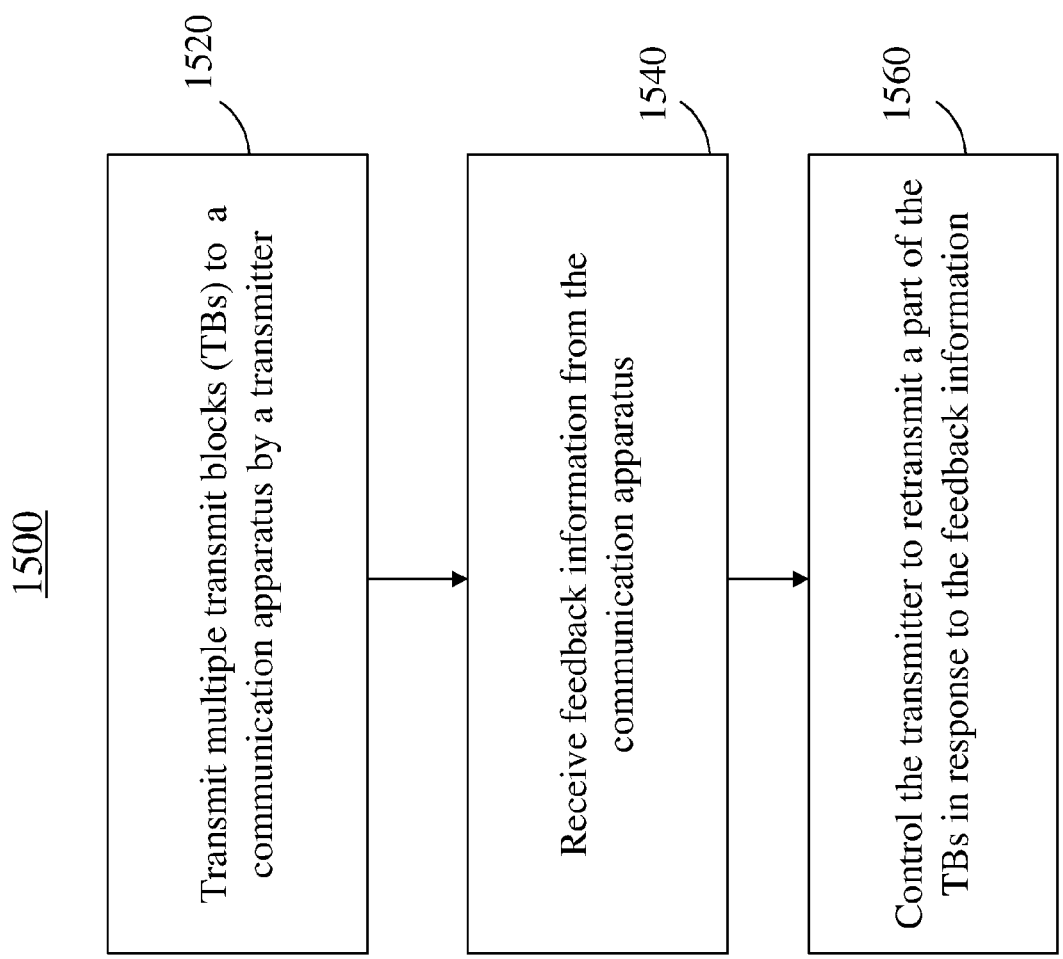
FIG. 15 schematically shows a flowchart of a communication method according to embodiments of the present invention.

FIG. 15 schematically shows a flowchart of a wireless communication method 1500 according to embodiments of the present invention.

In an embodiment, the communication method includes: step 1520, transmitting a plurality of transmit blocks (TBs) to a communication apparatus by a transmitter; step 1540, receiving feedback information from a communication apparatus; and step 1560, controlling the transmitter to retransmit a part of the TBs in response to feedback information, wherein the feedback information is generated by the communication apparatus by performing at least one of multiplexing and bundling on at least a part of a plurality of feedback bits according to the number of the feedback bits, and wherein the feedback bits are respectively generated for the TBs received by the communication apparatus in the first time period.

In an embodiment, when the number of the feedback bits in the first time period is greater than a payload size of a feedback channel, the feedback information is generated by bundling a first part of the feedback bits to generate a bundled feedback bit, multiplexing a second part of feedback bits to generate multiplexed feedback bits, and combining the bundled feedback bit and the multiplexed feedback bits, wherein the feedback information is received from the feedback channel, and wherein the number of bits received from the feedback channel is not greater than the payload size of the feedback channel.

In an embodiment, when the number of the feedback bits is greater than a payload size of a feedback channel, the feedback information is generated by bundling all of the feedback bits in a unit of at least two feedback bits, wherein the feedback information is received by the transmitter from the feedback channel, and wherein the number of the bits received from the feedback channel is not greater than the payload size of the feedback channel.

In an embodiment, when the number of the feedback bits is not greater than a payload size of a feedback channel, the feedback information is generated by multiplexing the plurality of feedback bits.

Advantageously, by performing at least one of multiplexing and bundling on the feedback bits according to the number of the feedback bits to generate feedback information, unnecessary retransmission can be avoided, the communication delay can be decreased, and the communication performance and the flexibility of the feedback can be greatly improved.

In an embodiment, the feedback information is transmitted by the communication apparatus according to a timing.

In an embodiment, the timing is determined according to indicated information in a scheduling assignment received by the communication apparatus within a first scheduling assignment resource pool in the first time period.

In an embodiment, the timing is determined according to an index of at least one of a subframe and a physical resource block (PRB) of a first scheduling assignment resource pool allocated to the TBs received by the communication apparatus in the first time period.

In an embodiment, when the timing is determined to be within a subframe set of a second scheduling assignment resource pool in a second time period after the first time period, the feedback information is transmitted by the communication apparatus in a format of sidelink control information (SCI) within the second scheduling assignment resource pool according to the timing.

Advantageously, by transmitting the feedback information within the SA resource pool in a format of SCI, there is no need to specify a physical feedback layer, therefore, the compatibility of the communication can be improved thereof.

In an embodiment, the timing is determined to be within a subframe set of a data resource pool for transmitting data by the communication apparatus, and wherein the communication apparatus is operative to transmit the data carrying the feedback information in a format of media access control (MAC) control element (CE) within the data resource pool according to the timing.

Advantageously, by transmitting feedback information with data within the data resource pool, SA overhead can be saved. Moreover, as there is no need to specify a physical feedback layer, the compatibility of the communication can be improved.

In an embodiment, the timing is determined to be within a subframe set of a feedback resource pool configured or preconfigured for the feedback channel, and wherein at least one transmission PRB of the feedback resource pool is indicated by a first scheduling assignment received by communication apparatus in the first time period.

In an embodiment, when a plurality of PRBs of a scheduling assignment resource pool in a second time period after the first time period are configured or preconfigured as the feedback resource pool, the feedback information is transmitted in a format of sidelink control information (SCI) by the communication apparatus in the at least one transmission PRB within the feedback resource pool.

In an embodiment, when a plurality of PRBs of a data resource pool in the first time period are configured or preconfigured as the feedback resource pool, the feedback information is transmitted by the communication apparatus in a format of MAC CE in the at least one transmission PRB within the feedback resource pool.

Advantageously, by configuring or preconfiguring a feedback resource pool for the feedback channel, the feedback channel can be better protected and the reliability of communication can be improved.

In an embodiment, a plurality of fixed PRBs of a scheduling assignment resource pool are allocated for transmitting the feedback information, and wherein the feedback information is transmitted in a format of sidelink control information (SCI) in the fixed PRBs within the scheduling assignment resource pool.

Advantageously, by allocating fixed PRB for transmitting the feedback information, the frequency/timing of feedback is determined, so there is no need to explicitly indicate in SA, which can save SA overhead. And as there is no need to specify a physical feedback layer, the compatibility of the communication can be improved.

The above description is on illustrative embodiments of the present disclosure, but not for limitation.

In addition, embodiments of the present disclosure can at least provide the following subject matters.

(1). A communication apparatus operative for communication via sidelink, comprising:
a receiver, operative to receive, in a first time period, a plurality of transport blocks (TBs) transmitted from another communication apparatus; and
circuitry, operative to generate a plurality of feedback bits respectively for the received TBs, and perform at least one of multiplexing and bundling on at least a part of the feedback bits according to the number of the feedback bits to generate feedback information.

(2). The communication apparatus according to claim (1), wherein the circuitry comprises a generator, when the number of the feedback bits generated for the TBs received in the first time period is greater than a payload size of a feedback channel, the generator is operative to bundle a first part of the feedback bits to generate a bundled feedback bit, multiplex a second part of feedback bits to generate multiplexed feedback bits, and combine the bundled feedback bit and the multiplexed feedback bits to generate the feedback information transmitted in the feedback channel, and wherein the number of bits transmitted in the feedback channel is not greater than the payload size of the feedback channel.

(3). The communication apparatus according to claim (1), wherein the circuitry comprises a generator, wherein when the number of the feedback bits is greater than a payload size of a feedback channel, the generator is operative to bundle all of the feedback bits in a unit of at least two feedback bits to generate the feedback information, and wherein the number of the bits transmitted in the feedback channel is not greater than the payload size of the feedback channel.

(4). The communication apparatus according to claim (1), wherein the circuitry comprises a generator, wherein when the number of the feedback bits is not greater than a payload size of a feedback channel, the generator is operative to multiplex the plurality of feedback bits to generate the feedback information.

(5). The communication apparatus according to claim (1), further comprising:
a transmitter, operative to transmit the feedback information according to a timing for transmitting the feedback information,
wherein the circuitry comprises determination circuitry operative to determine the timing for transmitting the feedback information.

(6). The communication apparatus according to claim (5), wherein the determination circuitry is operative to determine the timing according to indicated information in a scheduling assignment received within a first scheduling assignment resource pool in the first time period.

(7). The communication apparatus according to claim (5), wherein determination circuitry is operative to determine the timing according to an index of at least one of a subframe and a physical resource block (PRB) of a first scheduling assignment resource pool that are allocated to the TBs received in the first time period.

(8). The communication apparatus according to claims (6) or (7), wherein when the determination circuitry determines the timing is within a subframe set of a second scheduling assignment resource pool in a second time period after the first time period, the transmitter is operative to transmit the feedback information in a format of sidelink control information (SCI) within the second scheduling assignment resource pool according to the timing.

(9). The communication apparatus according to claim (5), wherein the determination circuitry is operative to determine the timing is within a subframe set of a data resource pool for transmitting data, and wherein the transmitter is operative to transmit the data carrying the feedback information in a format of media access control (MAC) control element (CE) within the data resource pool according to the timing.

(10). The communication apparatus according to claim (5), wherein the determination circuitry is operative to determine the timing is within a subframe set of a feedback resource pool configured or preconfigured for after the feedback channel, and wherein at least one transmission PRB of the feedback resource pool is indicated by a first scheduling assignment received in the first time period.

(11). The communication apparatus according to claim (10), wherein when the determination circuitry determines a plurality of PRBs of a scheduling assignment resource pool in a second time period after the first time period are configured or preconfigured as the feedback resource pool, the transmitter is operative to transmit the feedback information in a format of sidelink control information (SCI) in the at least one transmission PRB within the feedback resource pool.

(12). The communication apparatus according to claim (10), wherein when the determination circuitry determines a plurality of PRBs of a data resource pool in the first time period are configured or preconfigured as the feedback resource pool, the transmitter is operative to transmit the feedback information in a format of MAC CE in the at least one transmission PRB within the feedback resource pool.

(13). The communication apparatus according to claim (5), wherein the determination circuitry is operative to determine a plurality of fixed PRBs of a scheduling assignment resource pool allocated for transmitting the feedback information, and wherein the transmitter is operative to transmit the feedback information in a format of sidelink control information (SCI) in the fixed PRBs within the scheduling assignment resource pool.

(14). A communication method for communication via sidelink, comprising:

Receiving, in a first time period, a plurality of transport blocks (TBs) transmitted from another communication apparatus;

generating a plurality of feedback bits respectively for the TBs received in the first time period; and performing at least one of multiplexing and bundling on at least a part of the feedback bits according to the number of the feedback bits to generate feedback information.

(15). The communication method according to claim (14), wherein when the number of the feedback bits generated for the TBs received in the first time period is greater than a payload size of a feedback channel, the step of performing at least one of multiplexing and bundling on at least a part of a plurality of feedback bits comprises:

bundling a first part of the feedback bits to generate a bundled feedback bit;

multiplexing a second part of feedback bits to generate multiplexed feedback bits; and combining the bundled feedback bit and the multiplexed feedback bits to generate the feedback information transmitted in the feedback channel, wherein the number of bits transmitted in the feedback channel is not greater than the payload size of the feedback channel.

(16). The communication method according to claim (14), wherein when the number of the feedback bits is greater than a payload size of a feedback channel, the step of performing at least one of multiplexing and bundling on at least a part of a plurality of feedback bits comprises:

bundling all of the feedback bits in a unit of at least two feedback bits to generate the feedback information, wherein the number of the bits transmitted in the feedback channel is not greater than the payload size of the feedback channel.

(17). The communication method according to claim (14), wherein when the number of the feedback bits is not greater than a payload size of a feedback channel, the step of the performing at least one of multiplexing and bundling on at least a part of a plurality of feedback bits comprises:

multiplexing the plurality of feedback bits to generate the feedback information.

(18). The communication method according to claim (14), further comprising:

determining a timing for transmitting the feedback information; and transmitting the feedback information according to the timing.

(19). The communication method according to claim (18), wherein the step of determining a timing for transmitting the feedback information comprises:

determining the timing according to indicated information in a scheduling assignment received within a first scheduling assignment resource pool in the first time period.

(20). The communication method according to claim (18), wherein the step of determining a timing for transmitting the feedback information comprises:

determining the timing according to an index of at least one of a subframe and a physical resource block (PRB) of a first scheduling assignment resource pool that are allocated to the TBs received in the first time period.

(21). The communication method according to claims (18) or (19), wherein when the timing is within a subframe set of a second scheduling assignment resource pool in a second time period after the first time period, the step of transmitting the feedback information comprises:

transmitting the feedback information in a format of sidelink control information (SCI) within the second scheduling assignment resource pool according to the timing.

(22). The communication method according to claim (18), wherein when timing is determined to be within a subframe set of a data resource pool for transmitting data, the step of transmitting the feedback information comprises:

transmitting the data carrying the feedback information in a format of media access control (MAC) control element (CE) within the data resource pool according to the timing.

(23). The communication method according to claim (18), further comprising:

configuring or preconfiguring a feedback resource pool for the feedback channel, wherein the timing is determined to be within a subframe set of the feedback resource pool, and wherein at least one transmission PRB of the feedback resource pool is indicated by a first scheduling assignment received in the first time period.

(24). The communication method according to claim (23), wherein the step of configuring or preconfiguring a feedback resource pool for the feedback channel, comprises:

configuring or preconfiguring a plurality of PRBs of a scheduling assignment resource pool in a second time period after the first time period as the feedback resource pool, wherein the step of transmitting the feedback information communication method comprises:

transmitting the feedback information in a format of sidelink control information (SCI) in the at least one transmission PRB within the feedback resource pool.

(25). The communication method according to claim (23), wherein the step of configuring or preconfiguring a feedback resource pool for the feedback channel, comprises:

configuring or preconfiguring a plurality of PRBs of a data resource pool in the first time period as the feedback resource pool, wherein the step of transmitting the feedback information comprises:

transmitting the feedback information in a format of MAC CE in the at least one transmission PRB within the feedback resource pool.

(26). The communication method according to claim (18), further comprising:

determining a plurality of fixed PRBs of a scheduling assignment resource pool allocated for transmitting the feedback information, wherein the step of transmitting the feedback information comprises:

transmitting the feedback information in a format of sidelink control information (SCI) in the fixed PRBs within the scheduling assignment resource pool.

(27). A communication apparatus operative for communication via sidelink comprising:

a transmitter, operative to transmit a plurality of transmit blocks (TBs) to another communication apparatus;

a receiver, operative to receive feedback information from the another communication apparatus; and circuitry, operative to control the transmitter to retransmit a part of the TBs in response to feedback information, wherein the feedback information is generated by the another communication apparatus by performing at least one of multiplexing and bundling on at least a part of a plurality of feedback bits according to the number of the feedback bits, and wherein the feedback bits are respectively generated for the TBs received by the another communication apparatus in a first time period.

(28). The communication apparatus according to claim (27), wherein when the number of the feedback bits received in the first time period is greater than a payload size of a feedback channel, the another communication apparatus bundles a first part of the feedback bits to generate a bundled feedback bit, multiplexes a second part of feedback bits to generate multiplexed feedback bits, and combines the bundled feedback bit and the multiplexed feedback bits to generate the feedback information, wherein the transmitter receives the feedback information from the feedback channel, and wherein the number of bits received from the feedback channel is not greater than the payload size of the feedback channel.

(29). The communication apparatus according to claim (27), wherein when the number of the feedback bits is greater than a payload size of a feedback channel, the another communication apparatus bundles all of the feedback bits in a unit of at least two feedback bits, wherein the transmitter receives the feedback information from the feedback channel, and wherein the number of the bits received from the feedback channel is not greater than the payload size of the feedback channel.

(30). The communication apparatus according to claim (27), wherein when the number of the feedback bits is not greater than a payload size of a feedback channel, the another communication apparatus multiplexes the plurality of feedback bits to generate the feedback information.

(31). The communication apparatus according to claim (27), wherein the another communication apparatus transmits the feedback information according to a timing.

(32). The communication apparatus according to claim (31), wherein the another communication apparatus determines the timing according to indicated information in a scheduling assignment received within a first scheduling assignment resource pool in the first time period.

(33). The communication apparatus according to claim (31), wherein the another communication apparatus determines the timing according to an index of at least one of a subframe and a physical resource block (PRB) of a first scheduling assignment resource pool that are allocated to the TBs received in the first time period.

(34). The communication apparatus according to claims (32) or (33), wherein when the another communication apparatus determines the timing is within a subframe set of a second scheduling assignment resource pool in a second time period after the first time period, and wherein the another communication apparatus is operative to transmit the feedback information in a format of sidelink control information (SCI) within the second scheduling assignment resource pool according to the timing.

(35). The communication apparatus according to claim (31), wherein the another communication apparatus determines the timing is within a subframe set of a data resource pool for transmitting data by the, and wherein the another communication apparatus is operative to transmit the data carrying the feedback information in a format of media access control (MAC) control element (CE) within the data resource pool according to the timing.

(36). The communication apparatus according to claim (31), wherein the another communication apparatus determines the timing is within a subframe set of a feedback resource pool configured or preconfigured for the feedback channel, and wherein at least one transmission PRB of the feedback resource pool is indicated by a first scheduling assignment received by the another communication apparatus in the first time period.

(37). The communication apparatus according to claim (36), wherein when a plurality of PRBs of a scheduling assignment resource pool in a second time period after the first time period are configured or preconfigured as the feedback resource pool, the another communication apparatus transmits the feedback information in a format of sidelink control information (SCI) in the at least one transmission PRB within the feedback resource pool.

(38). The communication apparatus according to claim (36), wherein when a plurality of PRBs of a data resource pool in the first time period are configured or preconfigured as the feedback resource pool, the another communication apparatus transmits the feedback information in a format of MAC CE in the at least one transmission PRB within the feedback resource pool.

(39). The communication apparatus according to claim (31), wherein a plurality of fixed PRBs of a scheduling assignment resource pool are allocated for transmitting the feedback information, and wherein the another communication apparatus transmits the feedback information in a format of sidelink control information (SCI) in the fixed PRBs within the scheduling assignment resource pool.

(40). A communication method for communication via sidelink, comprising:
 transmitting a plurality of transmit blocks (TBs) to a communication apparatus;
 receiving feedback information from the communication apparatus; and
 controlling the transmitter to retransmit a part of the TBs in response to feedback information,
 wherein the feedback information is generated by the communication apparatus by performing at least one of multiplexing and bundling on at least a part of a plurality of feedback bits according to the number of the feedback bits, and wherein the feedback bits are respectively generated for the TBs received by the communication apparatus in a first time period.

(41). The communication method according to claim (40), wherein when the number of the feedback bits received by the communication apparatus in the first time period is greater than a payload size of a feedback channel, the feedback information is generated by bundling a first part of the feedback bits to generate a bundled feedback bit, multiplexing a second part of feedback bits to generate multiplexed feedback bits, and combining the bundled feedback bit and the multiplexed feedback bits, wherein the feedback information is received from the feedback channel, and wherein the number of bits received from the feedback channel is not greater than the payload size of the feedback channel.

(42). The communication method according to claim (40), wherein when the number of the feedback bits is greater than a payload size of a feedback channel, the feedback information is generated by bundling all of the feedback bits in a unit of at least two feedback bits, wherein the feedback information is received by the transmitter from the feedback channel, and wherein the number of the bits received from the feedback channel is not greater than the payload size of the feedback channel.

(43). The communication method according to claim (40), wherein when the number of the feedback bits is not greater than a payload size of a feedback channel, the feedback information is generated by multiplexing the plurality of feedback bits.

(44). The communication method according to claim (40), wherein the feedback information is transmitted by the communication apparatus according to a timing.

(45). The communication method according to claim (44), wherein the timing is determined according to indicated information in a scheduling assignment received by the communication apparatus within a first scheduling assignment resource pool in the first time period.

(46). The communication method according to claim (44), wherein the timing is determined according to an index of at least one of a subframe and a physical resource block (PRB) of a first scheduling assignment resource pool that are allocated to the TBs received by the communication apparatus in the first time period.

(47). The communication method according to claims (45) or (46), wherein when the timing is determined to be within a subframe set of a second scheduling assignment resource pool in a second time period after the first time period, the feedback information is transmitted by the communication apparatus in a format of sidelink control information (SCI) within the second scheduling assignment resource pool according to the timing.

(48). The communication method according to claim (44), wherein the timing is determined to be within a subframe set of a data resource pool for transmitting data by the communication apparatus, and wherein the communication apparatus is operative to transmit the data carrying the feedback information in a format of media access control (MAC) control element (CE) within the data resource pool according to the timing.

(49). The communication method according to claim (44), wherein the timing is determined to be within a subframe set of a feedback resource pool configured or preconfigured for the feedback channel, and wherein at least one transmission PRB of the feedback resource pool is indicated by a first scheduling assignment received by the communication apparatus in the first time period.

(50). The communication method according to claim (49), wherein when a plurality of PRBs of a scheduling assignment resource pool in a second time period after the first time period are configured or preconfigured as the feedback resource pool, the feedback information is transmitted by the communication apparatus in a format of sidelink control information (SCI) in the at least one transmission PRB within the feedback resource pool.

(51). The communication method according to claim (49), wherein when a plurality of PRBs of a data resource pool in the first time period are configured or preconfigured as the feedback resource pool, the feedback information is transmitted by the communication apparatus in a format of MAC CE in the at least one transmission PRB within the feedback resource pool.

(52). The communication apparatus according to claim (44), wherein a plurality of fixed PRBs of a scheduling assignment resource pool are allocated for transmitting the feedback information, and wherein the feedback information is transmitted by the communication apparatus in a format of sidelink control information (SCI) in the fixed PRBs within the scheduling assignment resource pool.

(53). A communication apparatus operative for communication via sidelink, comprising:
a receiver, operative to receive a plurality of transport blocks (TBs) in a first time period; and
circuitry, operative to generate feedback information according to the received TBs and determine a timing for transmitting the feedback information; and
a transmitter, operative to transmit the feedback information according to the timing.

(54). The communication apparatus according to claim (53), wherein the circuitry comprises determination circuitry operative to determine the timing according to indicated information in a scheduling assignment received within a first scheduling assignment resource pool in the first time period.

(55). The communication apparatus according to claim (53), wherein circuitry comprises determination circuitry operative to determine the timing according to an index of at least one of a subframe and a physical resource block (PRB) of a first scheduling assignment resource pool that are allocated to the TBs received in the first time period.

(56). The communication apparatus according to claims (54) or (55), wherein when the determination circuitry determines the timing is within a subframe set of a second scheduling assignment resource pool in a second time period after the first time period, the transmitter is operative to transmit the feedback information in a format of sidelink control information (SCI) within the second scheduling assignment resource pool according to the timing.

(57). The communication apparatus according to claim (53), wherein the determination circuitry is operative to determine the timing is within a subframe set of a data resource pool for transmitting data, and wherein the transmitter is operative to transmit the data carrying the feedback information in a format of media access control (MAC) control element (CE) within the data resource pool according to the timing.

(58). The communication apparatus according to claim (53), wherein the determination circuitry is operative to determine the timing is within a subframe set of a feedback resource pool configured or preconfigured for the feedback channel, and wherein at least one transmission PRB of the feedback resource pool is indicated by a first scheduling assignment received in the first time period.

(59). The communication apparatus according to claim (58), wherein when the determination circuitry determines a plurality of PRBs of a scheduling assignment resource pool in a second time period after the first time period are configured or preconfigured as the feedback resource pool, the transmitter is operative to transmit the feedback information in a format of sidelink control information (SCI) in the at least one transmission PRB within the feedback resource pool.

(60). The communication apparatus according to claim (58), wherein when the determination circuitry determines a plurality of PRBs of a data resource pool in the first time period are configured or preconfigured as the feedback resource pool, the transmitter is operative to transmit the feedback information in a format of MAC CE in the at least one transmission PRB within the feedback resource pool.

(61). The communication apparatus according to claim (53), wherein the determination circuitry is operative to determine a plurality of fixed PRBs of a scheduling assignment resource pool allocated for transmitting the feedback information, and wherein the transmitter is operative to transmit the feedback information in a format of sidelink control information (SCI) in the fixed PRBs within the scheduling assignment resource pool.

(62). The communication apparatus according to claim (53), wherein the circuitry comprises a generator operative to generate a plurality of feedback bits respectively for the TBs received in the first time period, and perform at least one of multiplexing and bundling on at least a part of the feedback bits according to the number of the feedback bits to generate the feedback information.

(63). The communication apparatus according to claim (62), when the number of the feedback bits generated for the TBs received in the first time period is greater than a payload size of a feedback channel, the generator bundles a first part of the feedback bits to generate a bundled feedback bit, multiplexes a second part of feedback bits to generate multiplexed feedback bits, and combines the bundled feedback bit and the multiplexed feedback bits to generate the feedback information transmitted in the feedback channel, and wherein the number of bits transmitted in the feedback channel is not greater than the payload size of the feedback channel.

(64). The communication apparatus according to claim (62), wherein when the number of the feedback bits is greater than a payload size of a feedback channel, the generator bundles all of the feedback bits in a unit of at least two feedback bits to generate the feedback information, and wherein the number of the bits transmitted in the feedback channel is not greater than the payload size of the feedback channel.

(65). The communication apparatus according to claim (62), wherein when the number of the feedback bits is not greater than a payload size of a feedback channel, the generator multiplexes the plurality of feedback bits to generate the feedback information.

(66). A communication method for communicating via sidelink, comprising:

receiving a plurality of transport blocks (TBs) in a first time period;

generating feedback information according to the received TBs;

determining a timing for transmitting the feedback information; and transmitting the feedback information according to the timing.

(67). The communication method according to claim (66), wherein the step of determining a timing for transmitting the feedback information comprises:

determining the timing according to indicated information in a scheduling assignment received within a first scheduling assignment resource pool in the first time period.

(68). The communication method according to claim (66), wherein the step of determining a timing for transmitting the feedback information comprises:

determining the timing according to an index of at least one of a subframe and a physical resource block (PRB) of a first scheduling assignment resource pool allocated to the TBs received in the first time period.

(69). The communication method according to claims (67) or (68), wherein when the timing is determined to be within a subframe set of a second scheduling assignment resource pool in a second time period after the first time period, the step of transmitting the feedback information comprises:

transmitting the feedback information in a format of sidelink control information (SCI) within the second scheduling assignment resource pool according to the timing.

(70). The communication method according to claim (66), wherein when timing is determined to be within a subframe set of a data resource pool for transmitting data, the step of transmitting the feedback information comprises:

transmitting the data carrying the feedback information in a format of media access control (MAC) control element (CE) within the data resource pool according to the timing.

(71). The communication method according to claim (66), further comprising:

configuring or preconfiguring a feedback resource pool for the feedback channel, wherein the timing is determined to be within a subframe set of the feedback resource pool, and wherein at least one transmission PRB of the feedback resource pool is indicated by a first scheduling assignment received in the first time period.

(72). The communication method according to claim (71), wherein the step of configuring or preconfiguring a feedback resource pool for the feedback channel, comprises:

configuring or preconfiguring a plurality of PRBs of a scheduling assignment resource pool in a second time period after the first time period as the feedback resource pool, wherein the step of transmitting the feedback information communication method comprises:

transmitting the feedback information in a format of sidelink control information (SCI) in the at least one transmission PRB within the feedback resource pool.

(73). The communication method according to claim (71), wherein the step of configuring or preconfiguring a feedback resource pool for the feedback channel, comprises:

configuring or preconfiguring a plurality of PRBs of a data resource pool in the first time period as the feedback resource pool, wherein the step of transmitting the feedback information comprises:

transmitting the feedback information in a format of MAC CE in the at least one transmission PRB within the feedback resource pool.

(74). The communication method according to claim (66), further comprising:

determining a plurality of fixed PRBs of a scheduling assignment resource pool allocated for transmitting the feedback information, wherein the step of transmitting the feedback information comprises:

transmitting the feedback information in a format of sidelink control information (SCI) in the fixed PRBs within the scheduling assignment resource pool.

(75). The communication method according to claim (66), further comprising:

performing at least one of multiplexing and bundling on at least a part of the feedback bits according to the number of the feedback bits to generate the feedback information.

(76). The communication method according to claim (75), wherein when the number of the feedback bits generated for the TBs received in the first time period is greater than a payload size of a feedback channel, the step of performing at least one of multiplexing and bundling on at least a part of a plurality of feedback bits comprises:

bundling a first part of the feedback bits to generate a bundled feedback bit;

multiplexing a second part of feedback bits to generate multiplexed feedback bits; and combining the bundled feedback bit and the multiplexed feedback bits to generate the feedback information transmitted in the feedback channel, wherein the number of bits transmitted in the feedback channel is not greater than the payload size of the feedback channel.

(77). The communication method according to claim (75), wherein when the number of the feedback bits is greater than a payload size of a feedback channel, the step of performing at least one of multiplexing and bundling on at least a part of a plurality of feedback bits comprises:

bundling all of the feedback bits in a unit of at least two feedback bits to generate the feedback information, wherein the number of the bits transmitted in the feedback channel is not greater than the payload size of the feedback channel.

(78). The communication method according to claim (75), wherein when the number of the feedback bits is not greater than a payload size of a feedback channel, the step of the performing at least one of multiplexing and bundling on at least a part of a plurality of feedback bits comprises:
multiplexing the plurality of feedback bits to generate the feedback information.

(79) A communication apparatus operative for communication via sidelink comprising:
a transmitter, operative to transmit a plurality of transmit blocks (TBs) to another communication apparatus;
a receiver, operative to receive feedback information from the another communication apparatus; and
circuitry, operative to control the transmitter to retransmit a part of the TBs in response to feedback information,
wherein the another communication apparatus transmits the feedback information according to a timing.

(80). The communication apparatus according to claim (79), wherein the another communication apparatus determines the timing according to indicated information in a scheduling assignment received within a first scheduling assignment resource pool in the first time period.

(81). The communication apparatus according to claim (79), wherein the another communication apparatus determines the timing according to an index of at least one of a subframe and a physical resource block (PRB) of a first scheduling assignment resource pool that are allocated to the TBs received in the first time period.

(82). The communication apparatus according to claims (78) or (79), wherein when the another communication apparatus determines the timing is within a subframe set of a second scheduling assignment resource pool in a second time period after the first time period, the another communication apparatus is operative to transmit the feedback information in a format of sidelink control information (SCI) within the second scheduling assignment resource pool according to the timing.

(83). The communication apparatus according to claim (79), wherein the another communication apparatus determines the timing is within a subframe set of a data resource pool for transmitting data by the another communication apparatus, and wherein the another communication apparatus is operative to transmit the data carrying the feedback information in a format of media access control (MAC) control element (CE) within the data resource pool according to the timing.

(84). The communication apparatus according to claim (79), wherein the another communication apparatus determines the timing is within a subframe set of a feedback resource pool configured or preconfigured for the feedback channel, and wherein at least one transmission PRB of the feedback resource pool is indicated by a first scheduling assignment received in the first time period.

(85). The communication apparatus according to claim (84), wherein when a plurality of PRBs of a scheduling assignment resource pool in a second time period after the first time period are configured or preconfigured as the feedback resource pool, the another communication apparatus transmits the feedback information in a format of sidelink control information (SCI) in the at least one transmission PRB within the feedback resource pool.

(86). The communication apparatus according to claim (84), wherein when a plurality of PRBs of a data resource pool in the first time period are configured or preconfigured as the feedback resource pool, the another communication apparatus transmits the feedback information in a format of MAC CE in the at least one transmission PRB within the feedback resource pool.

(87). The communication apparatus according to claim (79), wherein the plurality of fixed PRBs of a scheduling assignment resource pool are allocated for transmitting the feedback information, and wherein the another communication apparatus transmits the feedback information in a format of sidelink control information (SCI) in the fixed PRBs within the scheduling assignment resource pool.

(88). The communication apparatus according to claim (79), wherein the another communication apparatus generates the feedback information by performing at least one of multiplexing and bundling on at least a part of a plurality of feedback bits according to the number of the feedback bits, and wherein the feedback bits are respectively generated for the TBs received by the another communication apparatus in the first time period.

(89). The communication apparatus according to claim (88), wherein when the number of the feedback bits is greater than a payload size of a feedback channel, the another communication apparatus bundles a first part of the feedback bits to generate a bundled feedback bit, multiplexes a second part of feedback bits to generate multiplexed feedback bits, and combines the bundled feedback bit and the multiplexed feedback bits to generate the feedback information, wherein the transmitter receives the feedback information from the feedback channel, and wherein the number of bits received from the feedback channel is not greater than the payload size of the feedback channel.

(90). The communication apparatus according to claim (88), wherein when the number of the feedback bits is greater than a payload size of a feedback channel, the another communication apparatus determines the bundles all of the feedback bits in a unit of at least two feedback bits to generate the feedback information, wherein the feedback information is received by the transmitter from the feedback channel, and wherein the number of the bits received from the feedback channel is not greater than the payload size of the feedback channel.

(91). The communication apparatus according to claim (88), wherein when the number of the feedback bits is not greater than a payload size of a feedback channel, the another communication apparatus multiplexes the plurality of feedback bits to generate the feedback information.

(92). A communication method for communicating via sidelink, comprising:
transmitting a plurality of transmit blocks (TBs) to a communication apparatus by a transmitter;
receiving feedback information from the communication apparatus; and
controlling the transmitter to retransmit a part of the TBs in response to feedback information transmitted from a communication apparatus,
wherein the feedback information is transmitted from the communication apparatus according to a timing.

(93). The communication method according to claim (92), wherein the timing is determined according to indicated information in a scheduling assignment received by the communication apparatus within a first scheduling assignment resource pool in the first time period.

(94). The communication method according to claim (92), wherein the timing is determined according to an index of at least one of a subframe and a physical resource block (PRB) of a first scheduling assignment resource pool that are allocated to the TBs received by the communication apparatus in the first time period.

(95). The communication method according to claims (93) or (94), wherein when the timing is determined to be within a subframe set of a second scheduling assignment resource pool in a second time period after the first time period, the feedback information is transmitted by the communication apparatus in a format of sidelink control information (SCI) within the second scheduling assignment resource pool according to the timing.

(96). The communication method according to claim (92), wherein the timing is determined to be within a subframe set of a data resource pool for transmitting data by the communication apparatus, and wherein the communication apparatus is operative to transmit the data carrying the feedback information in a format of media access control (MAC) control element (CE) within the data resource pool according to the timing.

(97). The communication method according to claim (92), wherein the timing is determined to be within a subframe set of a feedback resource pool configured or preconfigured for the feedback channel, and wherein at least one transmission PRB of the feedback resource pool is indicated by a first scheduling assignment transmitted by the transmitter in the first time period.

(98). The communication method according to claim (97), wherein when a plurality of PRBs of a scheduling assignment resource pool in a second time period after the first time period are configured or preconfigured as the feedback resource pool, the feedback information is transmitted by the communication apparatus in a format of sidelink control information (SCI) in the at least one transmission PRB within the feedback resource pool.

(99). The communication method according to claim (97), wherein when a plurality of PRBs of a data resource pool in the first time period are configured or preconfigured as the feedback resource pool, the feedback information is transmitted by the communication apparatus in a format of MAC CE in the at least one transmission PRB within the feedback resource pool.

(100). The communication apparatus according to claim (92), wherein a plurality of fixed PRBs of a scheduling assignment resource pool are allocated for transmitting the feedback information, and wherein the feedback information is transmitted in a format of sidelink control information (SCI) in the fixed PRBs within the scheduling assignment resource pool.

(101). The communication apparatus according to claim (92), wherein the feedback information is generated by the communication apparatus by performing at least one of multiplexing and bundling on at least a part of a plurality of feedback bits according to the number of the feedback bits, and wherein the feedback bits are respectively generated for the received TBs in the first time period.

(102). The communication method according to claim (101), wherein when the number of the feedback bits is greater than a payload size of a feedback channel, the feedback information is generated by bundling a first part of the feedback bits to generate a bundled feedback bit, multiplexing a second part of feedback bits to generate multiplexed feedback bits, and combining the bundled feedback bit and the multiplexed feedback bits, wherein the feedback information is received by the transmitter from the feedback channel, and wherein the number of bits received from the feedback channel is not greater than the payload size of the feedback channel.

(103). The communication method according to claim (101), wherein when the number of the feedback bits is greater than a payload size of a feedback channel, the feedback information is generated by bundling all of the feedback bits in a unit of at least two feedback bits, wherein the feedback information is received by the transmitter from the feedback channel, and wherein the number of the bits received from the feedback channel is not greater than the payload size of the feedback channel.

(104). The communication method according to claim (101), wherein when the number of the feedback bits is not greater than a payload size of a feedback channel, the feedback information is generated by multiplexing the plurality of feedback bits.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Examples of several embodiments of the present disclosure have been described in detail above, with reference to the attached illustrations of specific embodiments. Because it is not possible, of course, to describe every conceivable combination of components or techniques, those skilled in the art will appreciate that various modifications may be made to the above described embodiments without departing from the scope of the present disclosure. For example, it will be readily appreciated that although the above embodiments are described with reference to parts of a The 3rd Generation Partnership Project (3GPP) network, an embodiment of the present disclosure will also be applicable to like networks, such as a successor of the 3GPP network, having like functional components.

Therefore, in particular, the terms 3GPP and associated or related terms used in the above description and in the enclosed drawings and any appended claims now or in the future are to be interpreted accordingly.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Notably, modifications and other embodiments of the disclosed disclosure(s) will come to mind to one skilled in the art having the benefit of the teachings presented in the foregoing descriptions and the associated drawings. Therefore, it is to be understood that the disclosure(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A communication apparatus operative for communication via sidelink, comprising:
    a receiver, operative to receive, in a first time period, a plurality of transport blocks (TBs) transmitted from another communication apparatus;
    circuitry, operative to generate a plurality of feedback bits respectively for the received TBs, and perform at least one of multiplexing and bundling on at least a part of the feedback bits according to a number of the feedback bits to generate feedback information; and
    a transmitter, operative to transmit the feedback information according to a timing for transmitting the feedback information,
    wherein
    the circuitry comprises determination circuitry operative to determine the timing for transmitting the feedback information, and
    the determination circuitry is operative to determine the timing according to an index of at least one of a subframe or a physical resource block (PRB) of a first scheduling assignment resource pool that are allocated to the TBs received in the first time period.

2. The communication apparatus according to claim 1, wherein the circuitry comprises a generator, wherein when the number of the feedback bits generated for the TBs received in the first time period is greater than a payload size of a feedback channel, the generator is operative to bundle a first part of the feedback bits to generate a bundled feedback bit, multiplex a second part of the feedback bits to generate multiplexed feedback bits, and combine the bundled feedback bit and the multiplexed feedback bits to generate the feedback information transmitted in the feedback channel, and wherein a number of bits transmitted in the feedback channel is not greater than the payload size of the feedback channel.

3. The communication apparatus according to claim 1, wherein the circuitry comprises a generator, wherein when the number of the feedback bits is greater than a payload size of a feedback channel, the generator is operative to bundle all of the feedback bits in a unit of at least two feedback bits to generate the feedback information, and wherein a number of bits transmitted in the feedback channel is not greater than the payload size of the feedback channel.

4. The communication apparatus according to claim 1, wherein the circuitry comprises a generator, wherein when the number of the feedback bits is not greater than a payload size of a feedback channel, the generator is operative to multiplex the feedback bits to generate the feedback information.

5. The communication apparatus according to claim 1, wherein the determination circuitry is operative to determine the timing according to indicated information in a scheduling assignment received within a first scheduling assignment in the first time period.

6. The communication apparatus according to claim 5, wherein when the determination circuitry determines the timing is within a subframe set of a second scheduling assignment resource pool in a second time period after the first time period, the transmitter is operative to transmit the feedback information in a format of sidelink control information (SCI) within the second scheduling assignment resource pool according to the timing.

7. The communication apparatus according to claim 1, wherein the determination circuitry is operative to determine the timing within a subframe set of a data resource pool for transmitting data, and wherein the transmitter is operative to transmit the data carrying the feedback information in a format of media access control (MAC) control element (CE) within the data resource pool according to the timing.

8. The communication apparatus according to claim 1, wherein the determination circuitry is operative to determine the feedback timing within a subframe set of a feedback resource pool configured or preconfigured for the feedback channel, and wherein at least one transmission PRB of the feedback resource pool is indicated by a first scheduling assignment received in the first time period.

9. The communication apparatus according to claim 8, wherein when the determination circuitry determines a plurality of PRBs of a scheduling assignment resource pool in a second time period after the first time period are configured or preconfigured as the feedback resource pool, the transmitter is operative to transmit the feedback information in a format of sidelink control information (SCI) in the at least one transmission PRB within the feedback resource pool.

10. The communication apparatus according to claim 8, wherein when the determination circuitry determines a plurality of PRBs of a data resource pool in the first time period are configured or preconfigured as the feedback resource pool, the transmitter is operative to transmit the feedback information in a format of media access control (MAC) control element (CE) in the at least one transmission PRB within the feedback resource pool.

11. The communication apparatus according to claim 1, wherein the determination circuitry is operative to determine a plurality of fixed PRBs of a scheduling assignment resource pool allocated for transmitting the feedback information, and wherein the transmitter is operative to transmit the feedback information in a format of sidelink control information (SCI) in the fixed PRBs within the scheduling assignment resource pool.

12. A communication method of a communication apparatus for communication via sidelink, comprising:
    receiving, in a first time period, a plurality of transport blocks (TBs) transmitted from another communication apparatus;
    generating a plurality of feedback bits respectively for the TBs received in the first time period;
    performing at least one of multiplexing and bundling on at least a part of the feedback bits according to a number of the feedback bits to generate feedback information;
    determining a timing for transmitting the feedback information according to an index of at least one of a subframe or a physical resource block (PRB) of a first scheduling assignment resource pool that are allocated to the TBs received in the first time period; and transmitting the feedback information according to the determined timing for transmitting the feedback information.

13. A communication apparatus operative for communication via sidelink comprising:

a transmitter, operative to transmit a plurality of transmit blocks (TBs) to another communication apparatus;

a receiver, operative to receive feedback information from the another communication apparatus; and circuitry, operative to control the transmitter to retransmit a part of the TBs in response to the feedback information, wherein the feedback information is generated by the another communication apparatus by performing at least one of multiplexing and bundling on at least a part of a plurality of feedback bits according to a number of the feedback bits, and wherein the feedback bits are respectively generated for the TBs received by the another communication apparatus in a first time period, and wherein a feedback timing for the another communication apparatus to transmit the feedback information is determined by the another communication apparatus according to an index of at least one of a subframe or a physical resource block (PRB) of a first scheduling assignment resource pool that are allocated to the TBs received in the first time period, and wherein the feedback information is transmitted by the another communication apparatus according to the determined feedback timing.

14. A communication method for communication via sidelink, comprising:

transmitting a plurality of transmit blocks (TBs) to a communication receiving feedback information from the communication apparatus; and controlling the transmitter to retransmit a part of the TBs in response to the feedback information, wherein the feedback information is generated by the communication apparatus by performing at least one of multiplexing and bundling on at least a part of a plurality of feedback bits according to a number of the feedback bits, and wherein the feedback bits are respectively generated for the TBs received by the communication apparatus in a first time period, and wherein a feedback timing for the communication apparatus to transmit the feedback information is determined by the communication apparatus according to an index of at least one of a subframe or a physical resource block (PRB) of a first scheduling assignment resource pool that are allocated to the TBs received in the first time period, and wherein the feedback information is transmitted by the communication apparatus according to the determined feedback timing.

* * * * *